United States Patent
Tsujimoto et al.

(10) Patent No.: US 9,912,837 B2
(45) Date of Patent: *Mar. 6, 2018

(54) IMAGE OUTPUT SYSTEM, INFORMATION PROCESSING DEVICE, AND AUTHENTICATION DEVICE

(71) Applicant: Sharp Kabushiki Kaisha, Osaka (JP)

(72) Inventors: Kunihiko Tsujimoto, Osaka (JP); Mikako Kimura, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/381,852

(22) Filed: Dec. 16, 2016

(65) Prior Publication Data

US 2017/0118378 A1 Apr. 27, 2017

Related U.S. Application Data

(63) Continuation of application No. 14/808,242, filed on Jul. 24, 2015, now Pat. No. 9,560,231, which is a (Continued)

(30) Foreign Application Priority Data

Dec. 19, 2011 (JP) .................................. 2011-277485
Dec. 19, 2011 (JP) .................................. 2011-277486

(51) Int. Cl.
*H04N 1/44* (2006.01)
*H04N 1/00* (2006.01)

(52) U.S. Cl.
CPC ....... *H04N 1/4433* (2013.01); *H04N 1/00251* (2013.01); *H04N 1/00334* (2013.01); (Continued)

(58) Field of Classification Search
CPC ... G06F 21/608; G06F 21/30; H04N 1/00244; H04N 2201/3222; H04N 2201/3269; H04N 2201/3273
(Continued)

(56) References Cited

U.S. PATENT DOCUMENTS

| | | |
|---|---|---|
| 5,842,023 A | 11/1998 | Tsumura |
| 7,398,405 B2 | 7/2008 | Aoki et al. |

(Continued)

FOREIGN PATENT DOCUMENTS

| | | |
|---|---|---|
| JP | 2002-259108 A | 9/2002 |
| JP | 2002-287919 | 10/2002 |

(Continued)

OTHER PUBLICATIONS

Co-pending U.S. Appl. No. 14/808,242, filed Jul. 24, 2015.
International Search Report for corresponding International Application No. PCT/JP2012/082439 dated Jan. 15, 2013.

*Primary Examiner* — Negussie Worku
(74) *Attorney, Agent, or Firm* — Renner, Otto, Boisselle & Sklar, LLP

(57) ABSTRACT

An information processing terminal transmits, to an authentication server, information obtained by imaging a code pattern of multifunction device information, and authentication information inputted by a user. The authentication server performs user authentication based on the received authentication information and specifies a multifunction device based on the received information of the code pattern. If the user has been authenticated, the authentication server transmits print data corresponding to the user to the multifunction device and prescribes the execution of print processing to the multifunction device. The multifunction device executes print process based on the obtained print data.

11 Claims, 17 Drawing Sheets

Related U.S. Application Data continuation of application No. 14/366,151, filed as application No. PCT/JP2012/082439 on Dec. 14, 2012, now Pat. No. 9,131,093.

(52) U.S. Cl.
CPC ....... *H04N 1/00336* (2013.01); *H04N 1/4413* (2013.01); *H04N 1/4426* (2013.01); *H04N 2201/0094* (2013.01)

(58) Field of Classification Search
USPC ..... 358/1.14, 1.15, 1.16, 1.9, 437, 448, 462, 358/504, 519; 382/115, 100, 117, 124, 382/209
See application file for complete search history.

(56) References Cited

U.S. PATENT DOCUMENTS

| | | | |
|---|---|---|---|
| 7,641,104 B1 | 1/2010 | Leon | |
| 7,730,490 B2 | 6/2010 | Ito | |
| 7,769,206 B2 | 8/2010 | Monden | |
| 8,164,764 B2 | 4/2012 | Fujiwara et al. | |
| 8,203,732 B2 | 6/2012 | Shiiyama | |
| 8,332,958 B2 | 12/2012 | Nishimi et al. | |
| 8,456,670 B2 | 6/2013 | Kusakabe | |
| 8,542,379 B2* | 9/2013 | Yun | G03G 21/02 358/1.13 |
| 8,891,106 B1 | 11/2014 | Haapanen | |
| 9,131,093 B2* | 9/2015 | Tsujimoto | G06F 3/1204 |
| 9,560,231 B2* | 1/2017 | Tsujimoto | G06F 3/1204 |
| 2002/0083001 A1 | 6/2002 | Ogishima | |
| 2006/0244995 A1 | 11/2006 | Kushida | |
| 2007/0133843 A1 | 6/2007 | Nakatani | |
| 2008/0030762 A1* | 2/2008 | Morita | G06F 3/1205 358/1.14 |
| 2008/0158598 A1* | 7/2008 | Yoshii | G06Q 10/107 358/1.15 |
| 2008/0209545 A1* | 8/2008 | Asano | H04L 9/3273 726/19 |
| 2008/0235434 A1 | 9/2008 | Eun | |
| 2008/0297825 A1 | 12/2008 | Hikichi | |
| 2009/0109476 A1 | 4/2009 | Ando | |
| 2010/0079785 A1 | 4/2010 | Emori et al. | |
| 2010/0171973 A1 | 7/2010 | Kimura | |
| 2010/0239093 A1 | 9/2010 | Hotta | |
| 2011/0063667 A1 | 3/2011 | Nishida | |
| 2011/0134456 A1* | 6/2011 | Tsujimoto | H04N 1/00204 358/1.13 |
| 2011/0261388 A1 | 10/2011 | Tsujimoto | |
| 2012/0057181 A1 | 3/2012 | Tsujimoto | |
| 2012/0099143 A1 | 4/2012 | Sasagawa | |
| 2012/0274964 A1 | 11/2012 | Kimura | |
| 2013/0027746 A1* | 1/2013 | Sasase | H04N 1/00209 358/1.15 |
| 2013/0033718 A1 | 2/2013 | Tsujimoto | |
| 2014/0241591 A1* | 8/2014 | Matsuki | G06K 9/00013 382/115 |
| 2014/0327787 A1* | 11/2014 | Tsujimoto | H04N 1/32112 348/207.2 |
| 2014/0337445 A1 | 11/2014 | Nishida | |
| 2014/0355039 A1* | 12/2014 | Tsujimoto | G06F 3/1204 358/1.14 |
| 2015/0146242 A1 | 5/2015 | Tsujimoto | |
| 2015/0146243 A1* | 5/2015 | Tsujimoto | G06F 3/1207 358/1.15 |
| 2016/0104030 A1* | 4/2016 | Matsunami | G06K 9/00013 382/115 |

FOREIGN PATENT DOCUMENTS

| | | |
|---|---|---|
| JP | 2004-104346 A | 4/2004 |
| JP | 2004-274520 | 9/2004 |
| JP | 2006-031368 A | 2/2006 |
| JP | 2006-185399 | 7/2006 |
| JP | 2006-309584 A | 11/2006 |
| JP | 2006-350688 A | 12/2006 |
| JP | 2007-034443 | 2/2007 |
| JP | 2007-164448 | 6/2007 |
| JP | 2007-264779 A | 10/2007 |
| JP | 2010-129031 A | 6/2010 |
| JP | 2010-160579 A | 7/2010 |
| JP | 2010-214961 A | 9/2010 |
| JP | 2010-224785 A | 10/2010 |
| JP | 2011-008564 A | 1/2011 |
| JP | 2011-048618 | 3/2011 |

\* cited by examiner

F I G. 1
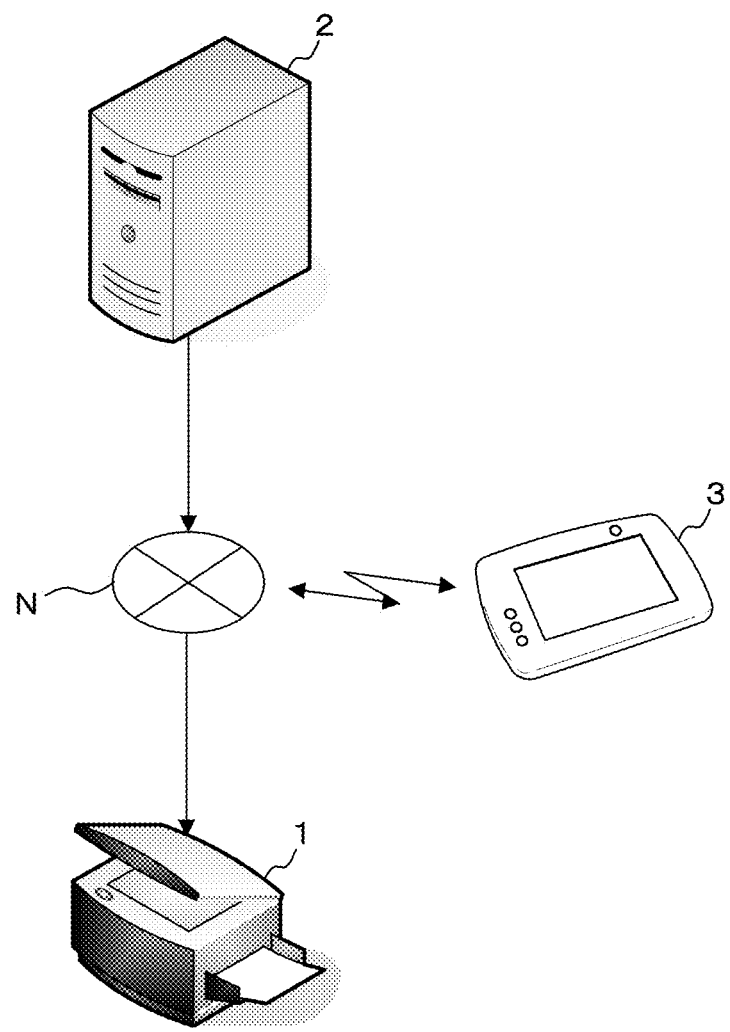

F I G. 4

21b

| MULTIFUNCTION DEVICE ID | IP ADDRESS | SETTING CONDITION |
|---|---|---|
| 123456 | 10.36.154.137 | COLOR, MONOCHROME, 1-up |
| 234567 | 10.36.154.41 | MONOCHROME, 1-up |
| 345678 | 10.36.154.35 | MONOCHROME, 1-up, N-up |
| ⋮ | ⋮ | ⋮ |

21c

| USER ID | PASSWORD | SETTING CONDITION |
|---|---|---|
| 12345 | aaa | MONOCHROME, 1-up |
| 23456 | bbb | MONOCHROME, 1-up, N-up |
| 34567 | ccc | COLOR, 1-up |
| ⋮ | ⋮ | ⋮ |

FIG. 10
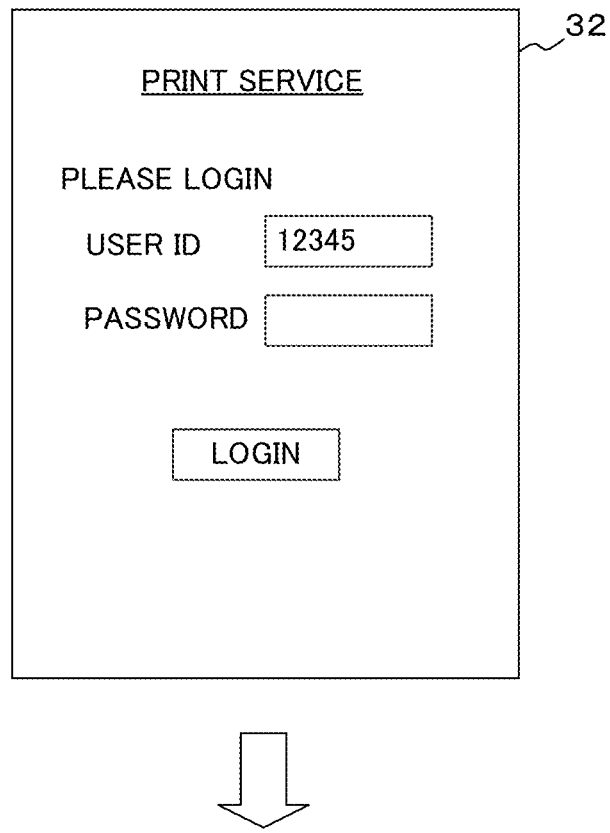
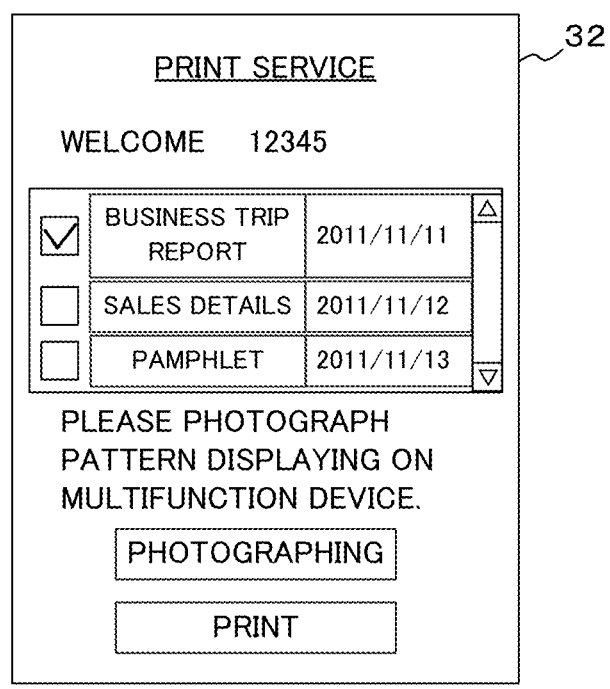

IMAGE OUTPUT SYSTEM, INFORMATION PROCESSING DEVICE, AND AUTHENTICATION DEVICE

CROSS-REFERENCE TO RELATED APPLICATION

This application is a continuation of U.S. patent application Ser. No. 14/808,242 filed on Jul. 24, 2015, which is a continuation of U.S. patent application Ser. No. 14/366,151 filed on Jun. 17, 2014, now U.S. Pat. No. 9,131,093 which is the national phase under 35 U.S.C. § 371 of PCT International Application PCT/JP2012/082439 which has an International filing date of Dec. 14, 2012 and designated the United States of America, which claims priority to Japanese Patent Application Nos. 2011-277485 and 2011-277486 filed on Dec. 19, 2011.

BACKGROUND

1. Technical Field

The present invention relates to: an image output system in which a user instructs, by using an information processing device, a desired image output device to output an image; the information processing device; and an authentication device which authenticates the user.

2. Description of Related Art

Recently, information terminal devices such as smartphones and tablet terminals have rapidly spread and a demand for printing processing of data such as photographs and documents stored in the information terminal devices has rapidly increased. The information terminal device includes a communication function for connecting to a network and transmits the data to a multifunction device via the network, to be able to easily print the data.

However, in order to transmit data to the multifunction device, specific information for specifying a multifunction device to which the data is transmitted is required. As the specific information for specifying the multifunction device, for example, an Internet Protocol (IP) address assigned to the multifunction device may be used. However, it is difficult to obtain such information. A method for posting the IP address assigned to the multifunction device on the multifunction device may be used to obtain the information, but this method has a security problem.

Therefore, Japanese Patent Application Laid-open No. 2004-274520 discloses a system for converting the specific information of each multifunction device into code patterns and displaying the code patterns on each multifunction device. In the system disclosed in Patent Document 1, a user photographs the code patterns by using a camera function of the information terminal device and decodes the code patterns, so as to obtain the specific information of the multifunction device. Thereby, it is possible to obtain the specific information of the multifunction device that the user desires to use, while maintaining the security.

SUMMARY

In the case of the multifunction device used in an office, to prevent information from leaking from the multifunction device and monitor the used information and the like, an authentication system for authenticating the user when using the multifunction device has been generally introduced.

Even the system disclosed in Japanese Patent Application Laid-open No. 2004-274520 has a configuration to make communication terminals authenticate each other based on a PIN code which is shared between the communication terminals. However, the configuration disclosed in Japanese Patent Application Laid-open No. 2004-274520 is not a structure to authenticate a user but instead is a structure to securely transmit and receive data. Further, in the configuration disclosed in Japanese Patent Application Laid-open No. 2004-274520, the PIN code needs to be set in the multifunction device in advance, and therefore, when several multifunction devices are installed, it is necessary to register and change the PIN codes for each of the multifunction devices. As a result, the system disclosed in Patent Document 1 has a problem that it is necessary to carry out such operations.

Further, the authentication system includes, for example, a computer which are used by a user, a multifunction device and an authentication server, and has a configuration in which a user requests authentication to the authentication server using the computer. Further, the authentication server is configured to receive a printing request to the desired multifunction device along with the authentication request from the user (computer), and transmit the printing request to the multifunction device designated by the user only when the user is authenticated. In this configuration, the specific information of the multifunction device is transmitted from the computer to the authentication server along with the authentication request, and communication identification information (specific information) such as the IP address is transmitted onto a communication path from the computer to the authentication server. Accordingly, there is a problem that secret information such as communication identification information may be illegally obtained.

The present invention has been made with the aim of solving the above problems. It is an object of the present invention to provide an image output system and an information processing device capable of allowing a user to easily use a desired image output device without knowing specific information of the image output device (multifunction device) in advance at the time of using the image output device itself. Further, it is another object of the present invention to provide an authentication device and an image output system capable of preventing illegal obtainment of secret information.

An image output system of the present invention is an image output system which comprises: an image output device outputting an image based on obtained data; an information processing device instructing execution of the image output by the image output device; and an authentication device authenticating a user who instructs the execution of the image output through the information processing device. The image output system is characterized in that the information processing device includes: a device information obtaining unit that obtains device information for specifying the image output device; an user information obtaining unit that obtains user information for specifying a user; and a transmitting unit that transmits the device information obtained by the device information obtaining unit and the user information obtained by the user information obtaining unit to the authentication device. The image output system is characterized in that the authentication device includes: an authentication unit that authenticates the user based on the user information obtained from the information processing device; a specifying unit that specifies the image output device based on the device information obtained from the information processing device; and a control unit that allows the user authenticated by the authentication unit to execute the image output instructed to the image output device specified by the specifying unit.

According to the present invention, in the image output system in which the user (instructor) instructs execution of the image output by the image output device by using the information processing device, the information processing device obtains the device information for specifying the image output device and the user information for specifying the user, and transmits the obtained information to the authentication device. The authentication device authenticates the user based on the obtained user information, specifies the image output device based on the obtained device information, and allows the authenticated user to execute the image output instructed to the specified image output device. When requesting authentication to the authentication device, the information processing device transmits the device information of the image output device to allow the authentication device to specify the image output device that the authenticated user desires to use.

In the image output system according to the present invention, the information processing device include a code reading unit that reads a code pattern coding the device information, and the device information obtaining unit obtains the device information read by the code reading unit.

According to the present invention, the information processing device reads the code pattern coding the device information to obtain the device information. Therefore, the user can easily obtain the device information of the image output device that the user desires to use, while maintaining security, without knowing the device information (destination information such as the IP address) of the image output device in advance.

In the image output system according to the present invention, the code reading unit includes an image obtaining unit, and the device information obtaining unit obtains the device information from data obtained by imaging the code pattern using the image obtaining unit.

According to the present invention, the information processing device obtains the device information from data obtained by imaging the code pattern coding the device information by using the image obtaining unit. Therefore, the device information of the image output device can be easily obtained using the information processing device having the camera function, while maintaining security.

In the image output system according to the present invention, the authentication device has a storage unit in which data to be processed by the image output device for each user are stored, and the control unit transmits the data stored in the storage unit in association with the user to the image output device.

According to the present invention, the authentication device stores the data to be processed by the image output device for each user, and transmits the data stored in association with the user to the image output device when the execution of the image output instructed by the user is permitted. Therefore, if the user stores, in the authentication device, the data to be processed in advance, the user only requests the authentication to the authentication device by using the information processing device, to execute the image output.

In the image output system according to the present invention, the device information includes information for specifying the authentication device assigned to the image output device. In the image output system, the information processing device includes an authentication device specifying unit that specifies the authentication device based on the device information, and the transmitting unit transmits the device information and the user information to the authentication device specified by the authentication device specifying unit.

According to the present invention, the device information includes the information for specifying the authentication device assigned to the image output device, and the information processing device specifies the authentication device based on the device information and transmits the device information and the user information to the specified authentication device. Therefore, even when burden is dispersed by a plurality of authentication devices, the information processing device can specify an appropriate authentication device and efficiently request the authentication.

In the image output system according to the present invention, the authentication device includes a request reception unit that receives a data request from the image output device, and the control unit transmits the data to the image output device based on the request received by the request reception unit, when the data cannot be transmitted to the image output device.

According to the present invention, when the data cannot be transmitted to the image output device, the authentication device transmits the data to the image output device based on the data request received from the image output device. Therefore, for example, even when the authentication device cannot transmit the data to the image output device, the data can be transmitted from the authentication device to the image output device depending on an access from the image output device. For example, when the authentication device is connected to an Internet and the image output device is connected to only the Intranet, only the address for the Intranet connection is set in the image output device, so that the authentication device cannot transmit data to the image output device through the Internet. However, the image output device can access the authentication device and periodically query the authentication device whether there is a printing request (image output request) to the image output device, and when there is a printing request, if the image output device is configured to obtain the data to be processed from the authentication device, it is possible to transmit the data from the authentication device to the image output device.

An information processing device of the present invention is an information processing device which instructs an execution of an image output by an image output device. The information processing device is characterized by including: an image obtaining unit; a device information obtaining unit that obtains device information from data obtained by imaging a code pattern coding the device information for specifying the image output device by using the image obtaining unit; a user information obtaining unit that obtains user information for specifying a user; and a transmitting unit that transmits the device information obtained by the device information obtaining unit and the user information obtained by the user information obtaining unit to an outside thereof.

According to the present invention, the information processing device obtains the device information from the data obtained by imaging the code pattern coding the device information of the image output device by its own image obtaining unit. Further, the information processing device obtains the user information for specifying the user, transmits the obtained device information and user information to the authentication device, and instructs an execution of an image output performed by an image output device. Therefore, if the user requests the authentication to the authentication device through the information processing device, the device information of the image output device that the user desires to use is notified the authentication device.

An authentication device of the present invention is an authentication device which authenticates a user using an image output device. The authentication device is characterized by including: a device information obtaining unit that obtains device information for specifying the image output device from an outside thereof; a user information obtaining unit that obtains user information for specifying a user from the outside; an authentication unit that authenticates the user based on the user information obtained by the user information obtaining unit; a specifying unit that specifies the image output device based on the device information obtained by the device information obtaining unit; and a permission unit that permits the user authenticated by the authentication unit to use the image output device specified by the specifying unit.

According to the present invention, the authentication device which authenticates the user using the image output device obtains the device information for specifying the image output device, and the user information for specifying the user from the outside. The authentication device authenticates the user based on the user information and specifies the image output device based on the device information. Further, the authentication device permits the authenticated user to use the specified image output device. Therefore, when the user requests the authentication of the authentication device by using the device which the user has, the device information of the image output device is transmitted to the authentication device, so that the authentication device can specify the image output device that the user desires to use.

The authentication device of the present invention includes: a destination storage unit that stores the device information and destination information of the image output device in association with each other; and a data storage unit that stores the data to be processed by the image output device for each user. In the authentication device, the specifying unit specifies the destination information of the image output device corresponding to the device information based on the information stored in the destination storage unit, and the permission unit transmits the data stored in the data storage unit in association with the user permitted to use the image output device to the image output device based on the destination information specified by the specifying unit.

According to the present invention, the authentication device stores the device information and the destination information of the image output device in association with each other, so that the authentication device can specify the destination information of the image output device corresponding to the obtained device information. Since the destination information (for example, network identification information of the IP address or the like) of the image output device is managed by the authentication device side, when the processing request of the image output device is transmitted from an external device (device to be used by the user) to the authentication device, there is no need to transmit the destination information of the image output device to the authentication device. Therefore, since the network identification information such as the IP address is not transmitted onto the communication path, it is possible to prevent the illegal obtainment of secret information such as the network identification information. It is also possible to reduce the risk of the secret information leakage by using the low security risk information such as the installation place of the image output device, as the device information.

Further, it is possible to unitarily manage the destination information of each image output device in the authentication device.

Further, since the data to be processed by the image output device are stored for each user at the authentication device, when the use of the image output device is permitted to the user, the authentication device transmits the data stored in association with the user to the image output device based on the specified destination information. Therefore, if the user stores, in the authentication device, the data to be processed in advance, the user only requests the authentication to the authentication device through the device which the user has, to execute the image output.

In the authentication device of the present invention, the device information obtaining unit obtains the setting conditions relating to the processing by the image output device along with the device information, and the permission unit transmits, to the image output device, the execution instruction of the image output based on the setting conditions obtained by the device information obtaining unit along with the data.

According to the present invention, the authentication device obtains the setting conditions relating to the processing by the image output device along with the device information, and transmits the execution instruction of the image output based on the obtained setting conditions to the image output device. Therefore, a user, who desires to request the printing to be executed by the image output device, may allow the device for the user to obtain the setting conditions along with the device information of the image output device and to transmit the obtained setting conditions to the authentication device. Thus, the execution of the printing processing based on the desired setting conditions can be requested and the printing processing can be performed smoothly.

In the authentication device of the present invention, the device information obtaining unit obtains status information relating to the operation state of the image output device along with the device information. The authentication device includes a determination unit that determines whether the image output device is able to operate based on the status information obtained by the device information obtaining unit.

According to the present invention, the authentication device obtains the status information relating to the operation state of the image output device along with the device information, and determines whether the image output device is able to operate based on the obtained status information. Therefore, when any error occurs in the image output device, the authentication device can understand the situation. Thus, it is possible to cope rapidly with the error.

In the authentication device according to the present invention, the user information obtaining unit obtains the permission information representing the use permission of the image output device instead of the user information. In the authentication device, when the user information obtaining unit obtains the permission information, the permission unit permits the use of the image output device specified by the specifying unit.

According to the present invention, the authentication device obtains the permission information representing the user permission of the image output device instead of the user information, and when obtaining the permission information, permits the use of the image output device without authenticating the user. Therefore, even though the user does not have an authority to use the image output device, it is possible to use the image output device.

The authentication device of the present invention includes: a user condition storage unit that stores the user and the setting conditions relating to the processing which can be executed by the user in association with each other; and a user condition specifying unit that specifies the setting conditions of the image output to be executed based on the setting conditions obtained by the device information obtaining unit and the setting conditions stored in the user condition storage unit. In the authentication device, the permission unit transmits, to the image output device, the execution instruction of the image output based on the setting conditions specified by the user condition specifying unit.

According to the present invention, the authentication device stores each user and the setting conditions relating to the processing which can be executed by each user in association with each other, and specifies the setting conditions of the image output to be executed based on the setting conditions obtained from the outside and the setting conditions previously stored for each user. Further, the authentication device transmits the execution instruction of the image output based on the specified setting conditions to the image output device. Therefore, by previously registering the setting conditions in which setting is permitted for each user in the authentication device, the authentication device can instruct the image output device to execute the printing processing based on the pre-registered setting conditions when obtaining the printing request from each user. In this case, the printing conditions which can be executed by each user can be limited, and the printing processing result in the pre-registered printing conditions can be reliably obtained.

The authentication device of the present invention include: a device condition storage unit that stores the image output device and setting conditions relating to the processing by the image output device in association with each other; and a device condition specifying unit that specifies the setting conditions of the image output to be executed based on the setting conditions obtained by the device information obtaining unit and the setting conditions stored in the device condition storage unit. In the authentication device, the permission unit transmits the execution instruction of the image output based on the setting conditions specified by the device condition specifying unit to the image output device.

According to the present invention, the authentication device stores each image output device and the setting conditions relating to processing by each image output device in association with each other, and specifies the setting conditions of the image output to be executed based on the setting conditions obtained from the outside and the setting conditions previously stored for each image output device. Further, the authentication device transmits the execution instruction of the image output based on the specified setting conditions to the image output device. Therefore, for example, even when the printing processing of the setting conditions obtained by the authentication device from the external device (device to be used by the user) cannot be executed by the corresponding image output device, the printing processing based on the setting conditions which can be executed by the image output device is reliably executed.

An image output system of the present invention is an image output system which includes: an image output device outputting an image based on obtained data; an information processing device instructing execution of the image output by the image output device; and an authentication device authenticating a user who instructs the image output by using the information processing device. The image output system is characterized in that the information processing device includes: a device information obtaining unit that obtains device information for specifying the image output device; a user information obtaining unit that obtains user information for specifying a user; and a transmitting unit that transmits the device information obtained by the device information obtaining unit and user information obtained by the user information obtaining unit to the authentication device. The image output system is characterized in that the authentication device includes: an authentication unit that authenticates the user based on the user information obtained from the information processing device; a specifying unit that specifies the image output device based on the device information obtained from the information processing device; and a permission unit that permits the user authenticated by the authentication unit to use the image output device specified by the specifying unit.

According to the present invention, in the image output system in which the user (instructor) instructs the execution of the image output by the image output device by using the information processing device, the information processing device obtains the device information of the image output device and the user information, and transmits the obtained information to the authentication device. The authentication device authenticates the user based on the obtained user information, specifies the image output device based on the obtained device information, and allows the authenticated user to execute the image output by the specified image output device. When the information processing device requests the authentication to the authentication device, the device information of the image output device is transmitted to the authentication device, so that the authentication device can specify the image output device that the authenticated user desires to use.

According to the present invention, in the system in which the user instructs an execution of the image output by the image output device by using the information processing device, the user need not know the information (destination information such as IP address) about the image output device in advance. In particular, in the system in which the user authentication is introduced at the time of the use of the image output device, when the user requests the authentication to the authentication device by using the information processing device, the device information of the image output device is also transmitted, so that the desired image output device can be easily used.

According to the present invention, the authentication device which authenticates the user using the image output device obtains the device information of the image output device along with the user information, and specifies the image output device based on the obtained device information. Since the image output device is specified by the authentication device side, the user need not know the information (destination information such as the IP address) relating to the image output device in advance. Further, the device information obtained from the outside by the authentication device does not include the destination information such as the IP address of the image output device, and when the authentication device specifies the destination information of the image output device, secret information such as the destination information is not transmitted, and therefore illegal obtainment of the secret information can be prevented.

The above and further objects and features will more fully be apparent from the following detailed description with accompanying drawings.

BRIEF DESCRIPTION OF THE SEVERAL VIEWS OF THE DRAWINGS

FIG. 1 is a schematic view illustrating a configuration of an image output system according to Embodiment 1;

FIG. 4 is a schematic view illustrating a configuration of a multifunction device information DB and a user information DB;

FIG. 10 is a schematic view illustrating a modified example of the printing request screen;

DETAILED DESCRIPTION

The following will describe in detail an image output system, an information processing device, and an authentication device according to the present invention with reference to the drawings illustrating some embodiments thereof.

(Embodiment 1)

Figure 2:
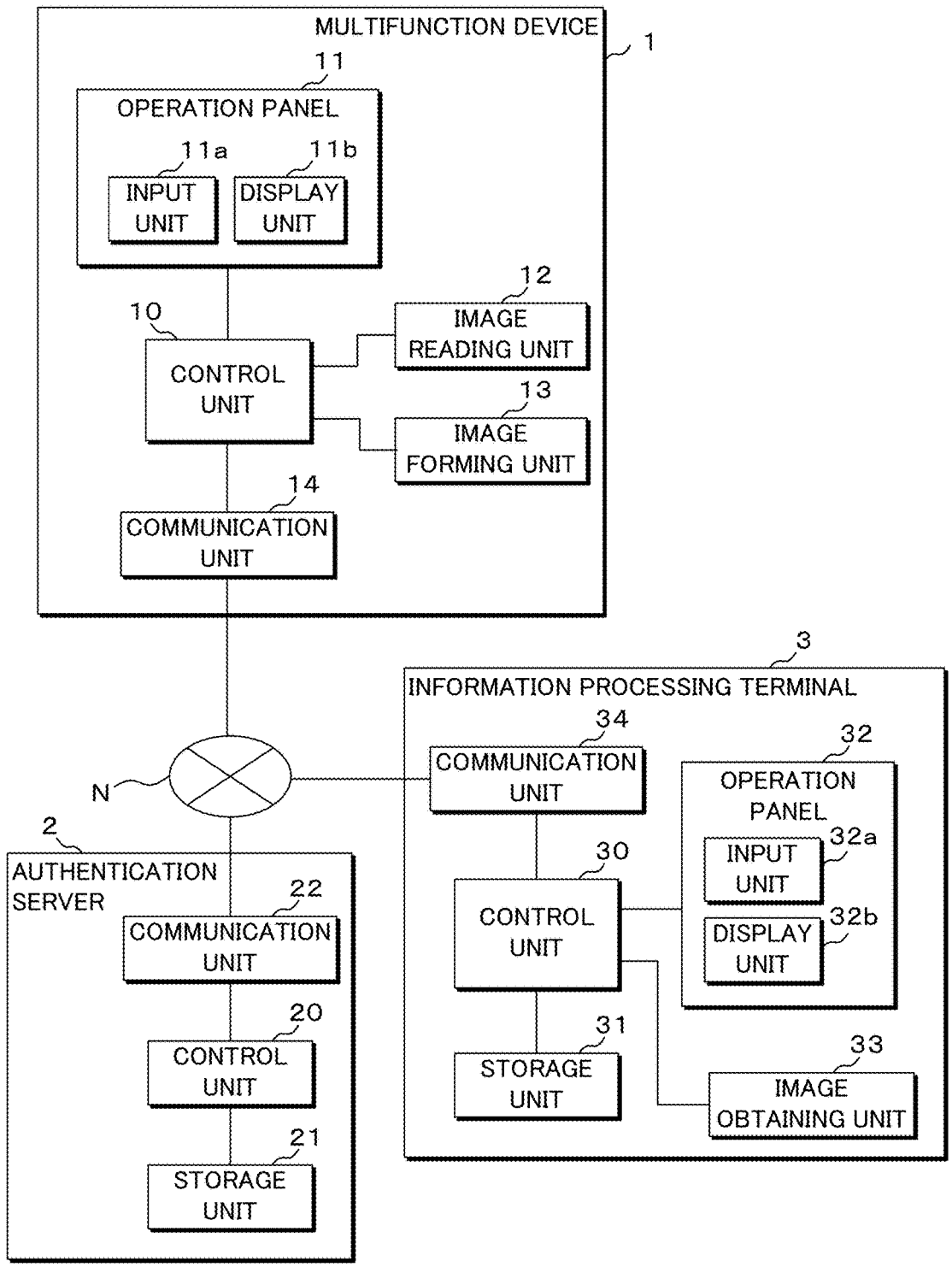
FIG. 2 is a block view illustrating a configuration of a multifunction device, an authentication server, and an information processing terminal.

FIG. 1 is a schematic view illustrating a configuration of an image output system according to Embodiment 1, and FIG. 2 is a block view illustrating a configuration of a multifunction device, an authentication server, and an information processing terminal. The image output system according to Embodiment 1 includes a multifunction device (image output device) 1, an authentication server (authentication device) 2, and an information processing terminal (information processing device) 3, each of which can be connected to a network N such as the Internet. Hereinafter, the system in which the multifunction device 1, the authentication server 2, and the information processing terminal 3 may be each provided singularly is described by way of example, but a plurality of any one or all of the multifunction device 1, the authentication server 2, and the information processing terminal 3 may also be provided, respectively.

The multifunction device 1 is a digital multifunction device or an analog multifunction device, and may be installed in, for example, a convenience store. The multifunction device 1 includes a control unit 10, an operation panel 11, an image reading unit 12, an image forming unit 13, a communication unit 14 and the like.

The operation panel 11 is a touch panel in which an input unit 11a and a display unit 11b are integrally configured. The input unit 11a includes various input keys required to operate the multifunction device 1 by a user and receives information based on the input key operated by the user and transmits the received information to the control unit 10. The display unit 11b is, for example, a liquid crystal display, a plasma display, an organic EL panel and the like, and displays information notified to the user, information required for an operation and the like depending on an instruction from the control unit 10. Further, the input unit 11a and the display unit 11b may be separately disposed, without using the touch panel.

The image reading unit 12 is, for example, a scanner including a charged coupled device (CCD) and reads characters, images and the like, which are printed on a document, as image data. Further, the image reading unit 12 may has a function of transferring sequentially each sheet of documents, which are placed on a predetermined document tray, up to positions read by the scanner.

The image forming unit 13 is an image forming means based on an electro-photographic system, an inkjet system, a thermal transfer system or the like, and performs a printing processing (image output) based on image data that the image reading unit 12 read from a document or printing data that the communication unit 14 receives from outside through a network N. The image forming unit 13 forms images (characters/photographs/graphics) on a recording sheet, such as recording paper, based on the image data or the printing data.

The communication unit 14 includes a network card, a modem and the like, and can be connected to the communication network N such as a public-line network, a local area network (LAN), and the Internet, and communicates with external devices, such as the authentication server 2 and the information processing terminal 3 through the network N. The communication unit 14 may be an interface for communication with wire, and may also be an interface for wireless communication. Further, the communication unit 14 may be directly connected with the authentication server 2 through a physical cable.

Further, the communication unit 14 has a function of transmitting and receiving an email, and may also transmit and receive an email through the network N.

The control unit 10 includes a central processing unit (CPU), a microprocessor unit (MPU) or the like, and controls operations of each unit which is included in the multifunction device 1. In detail, the CPU or the MPU of the control unit 10 loads and executes a control program previously stored in a ROM (not illustrated) into a RAM (not illustrated) to operate the multifunction device 1 as the image output device of the image output system according to the present invention.

Further, the multifunction device 1 includes a storage device (not illustrated) such as a hard disk drive (HDD) and stores various kinds of data (printing data) received from the external device as a data to be printed.

The authentication server 2 is a server computer, and is linked with the multifunction device 1 to perform the authentication processing of the user using the multifunction device 1. The authentication server 2 includes a control unit 20, a storage unit 21, a communication unit 22 and the like.

The storage unit 21 is a storage device such as an HDD, and stores various kinds of control programs, various kinds of data and the like, which are required for processing executed by the authentication server 2. Further, in the storage unit 21, an electronic data database (hereinafter, referred to an electronic data DB) 21a, a multifunction device information database (hereinafter, referred to as a multifunction device information DB) 21b, and a user information database (hereinafter, referred to as a user information DB) 21c are stored (see FIG. 3).

The communication unit 22 has the same configuration as the communication unit 14 of the multifunction device 1. Therefore, the communication unit 22 communicates with external devices, such as the multifunction device 1 and the information processing terminal 3 through the network N. Further, the communication unit 22 has a function of transmitting and receiving an email, and may also transmit and receive an email through the network N.

The control unit 20 includes the CPU, the MPU or the like, and controls an operation of each unit which is included in the authentication server 2. In detail, the CPU or the MPU of the control unit 20 loads and executes the control program previously stored in the storage unit 21 or the ROM (not illustrated) into the RAM (not illustrated) to operate the authentication server 2 as the authentication device of the image output system according to the present invention.

Figure 3:
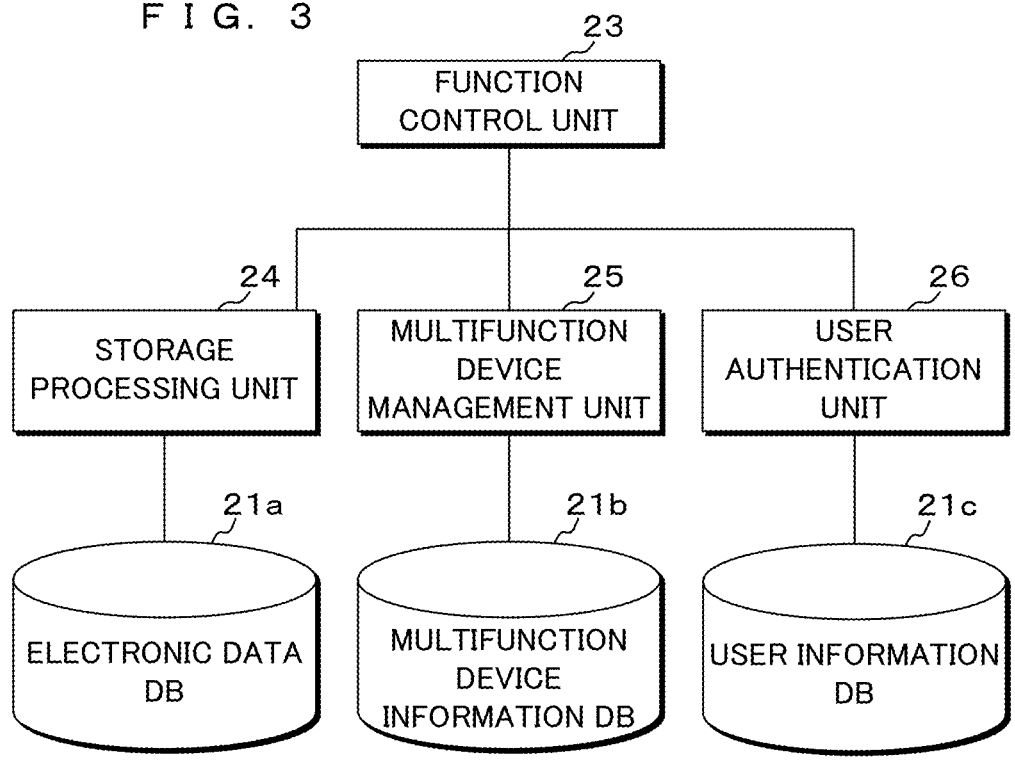
FIG. 3 is a block view illustrating a functional configuration of the authentication server.

FIG. 3 is a block view illustrating the functional configuration of the authentication server 2. In the control unit 20 of the authentication server 2, the CPU or the MPU executes a control program previously stored in the storage unit 21 or the ROM to realize each function of a function control unit 23, a storage processing unit 24, a multifunction device management unit 25, and a user authentication unit 26. The function control unit 23 controls each operation of the storage processing unit 24, the multifunction device management unit 25, and the user authentication unit 26.

The storage processing unit 24 stores the printing data (electronic file data to be printed by the multifunction device 1), which is received from the outside via the network N through the communication unit 22, in the electronic data DB 21a. Further, the communication unit 22 receives the printing data from the information processing terminal 3 and a personal computer (not illustrated) which can be connected to the network N. Further, the printing data are transmitted along with the user information of the user who uses the multifunction device 1 to perform the printing processing using the print service provided by the image output system. Further, the user who desires to use the print service provided by the image output system needs to be registered in advance and the user information transmitted along with the printing data is a user ID which is registered at the time of the user registration.

Therefore, when receiving the printing data from the outside, the storage processing unit 24 stores the received printing data in the electronic data DB 21a in association with the user ID received along with the printing data.

FIG. 4 is a schematic view illustrating a configuration of the multifunction device information DB 21b and the user information DB 21c.

The multifunction device information DB 21b are registered with a multifunction device ID for specifying each multifunction device 1, IP addresses assigned to each multifunction device 1, and setting conditions which can be used in each multifunction device 1 in association with one another. When the communication unit 22 of the authentication server 2 receives a change or an addition of the registration information of the multifunction device information DB 21b through the network N or the operation unit (not illustrated), the multifunction device management unit 25 updates the registration information of the multifunction device information DB 21b. The multifunction device management unit 25 manages the information of the multifunction device 1 to be managed by its own authentication server 2, based on the registration information of the multifunction device information DB 21b.

Further, if the information registered in the multifunction device information DB 21b is information which can identify each of the plurality of multifunction devices 1, the information is not limited to the above-described information.

According to Embodiment 1, the multifunction device ID (serial number) is used as the multifunction device information for specifying the multifunction device 1, but any information which can specify each of the multifunction devices 1, such as names given to each multifunction device 1 and information for specifying the installation place (convenience store) of the multifunction device 1, may be used. Further, according to Embodiment 1, the IP address is used as the destination information of the multifunction device 1, but the network identification information, such as a host name and a MAC address assigned to the multifunction device 1, may be used. Further, according to Embodiment 1, the setting conditions which can be used in each multifunction device 1 is registered in the multifunction device information DB 21b, but the above-described information may not be registered in the multifunction device information DB 21b.

The user information DB 21c is registered with the user ID and a password of the user registered in the print service by the user and the setting conditions that allow each user to use in the multifunction device 1 in association with each other. When the communication unit 22 of the authentication server 2 receives the change or addition of the registration information of the user information DB 21c through the network N, the control unit 20 updates the registration information of the user information DB 21c. Further, the setting conditions (setting conditions permitted to be used) which can be used in the multifunction device 1 by each user may not be registered in the user information DB 21c.

When the communication unit 22 receives the user authentication request along with the user ID and the password through the network N, the user authentication unit (authentication unit) 26 performs the authentication processing based on the registration contents of the user information DB 21c. In detail, the user authentication unit 26 compares and combines the user ID and the password received by the communication unit 22 with the registration information of the user information DB 21c to determine whether the user ID and the password are registered in the user information DB 21c.

Here, the description of FIG. 2 is referred to again. The information processing terminal 3 is a portable information terminal such as a portable computer, a portable game machine, a portable telephone, or a personal digital assistants (PDA). The information processing terminal 3 includes a control unit 30, a storage unit 31, an operation panel 32, an image obtaining unit 33, a communication unit 34 and the like.

The storage unit 31 is a storage device such as the HDD, a flash memory or the like, and stores various kinds of control programs required for processing executed by the information processing terminal 3, various kinds of data, image data obtained by imaging using the image obtaining unit 33 and the like.

The operation panel 32 has the same configuration as the operation panel 11 of the multifunction device 1 and includes an input unit 32a and a display unit 32b. The input unit 32a receives the information based on the input key operated by the user and transmits the received information to the control unit 30. The display unit 32b displays the information to be notified to the user, the information required for operation and the like depending on the instruction from the control unit 30.

The image obtaining unit 33 may be a camera, and performs a photoelectric conversion on an optical signal inputted through the CCD to obtain the image data.

The communication unit 34 has the same configuration as the communication unit 14 of the multifunction device 1. Therefore, the communication unit 34 communicates with the external devices, such as the multifunction device 1 and the authentication server 2 through the network N. Further, the information processing terminal 3 is a portable terminal device, and therefore the communication unit 34 may be configured to perform only the wireless communication.

The control unit 30 includes the CPU, the MPU or the like, and controls an operation of each unit which is included in the information processing terminal 3. In detail, the CPU or the MPU of the control unit 30 loads and executes the control program previously stored in the storage unit 31 or the ROM (not illustrated) into the RAM (not illustrated) to operate the information processing terminal 3 as the information processing device of the image output system according to the present invention.

In the image output system having the above-described configuration, for example, a user who is registered as a user in advance writes printing data such as documents using the personal computer at his/her home. Further, the user transmits the printing data from the personal computer at his/her home to the authentication server 2, and the printing data are registered in the authentication server 2. Further, when the user actually desires to use the multifunction device 1 to execute the printing processing, the user obtains the information of the multifunction device (device information) for specifying the multifunction device 1 using the information processing terminal 3, transmits the information of the multifunction device and the user information (authentication information) to the authentication server 2, and requests the user authentication and the printing execution to the authentication server 2. The authentication server 2 performs the user authentication required from the information processing terminal 3, and when the user is authenticated, transmits the printing data kept in association with the user to the multifunction device 1, and instructs the execution of the printing processing. Further, the processing of registering the printing data in the authentication server 2 and the processing of requesting the user authentication and the printing execution to the authentication server 2 are performed, for example, through the web page provided from the print service by the image output system.

Figure 5:
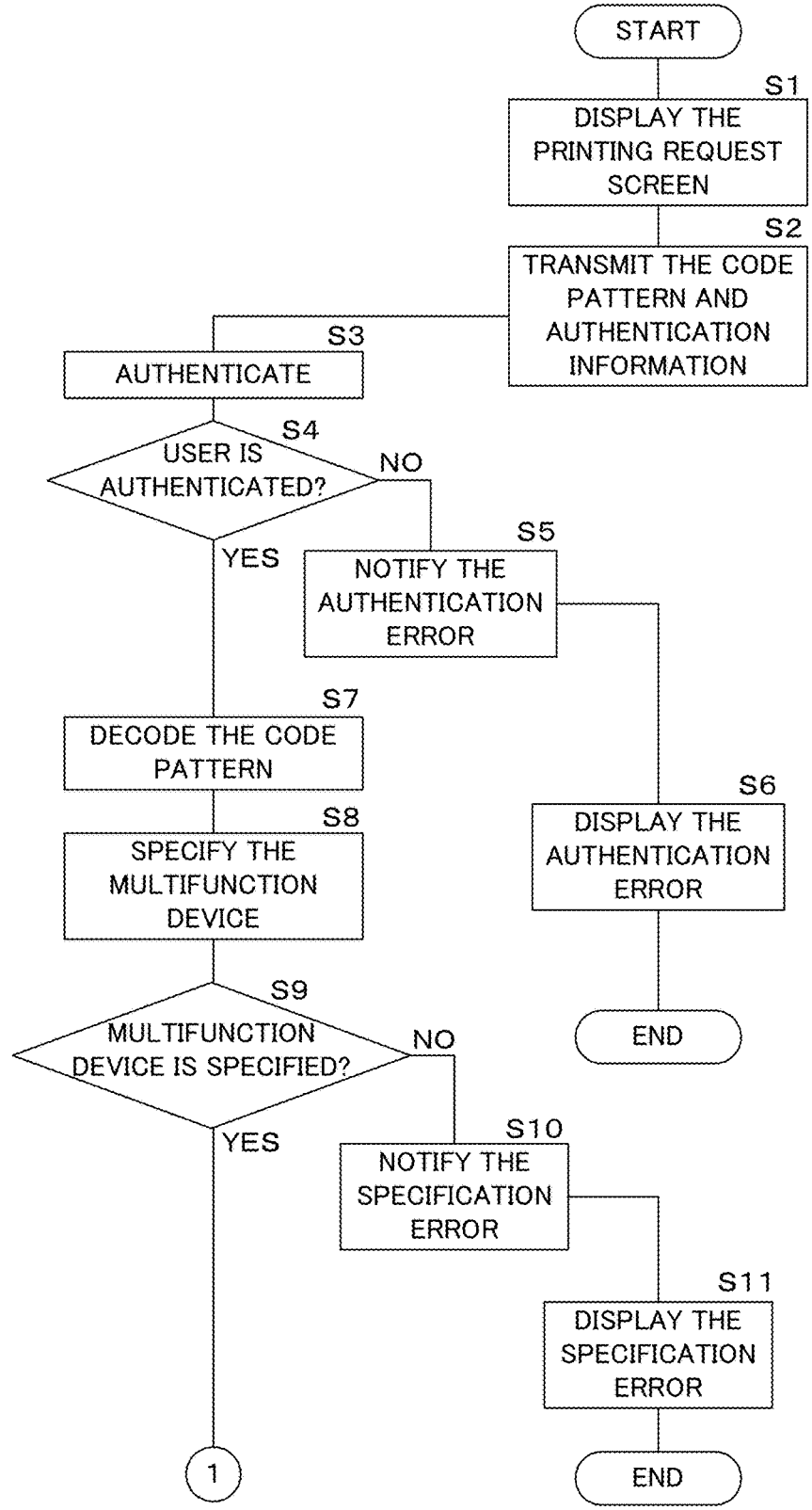
FIG. 5 is a flowchart illustrating a procedure of printing processing by the image output system.
Figure 6:
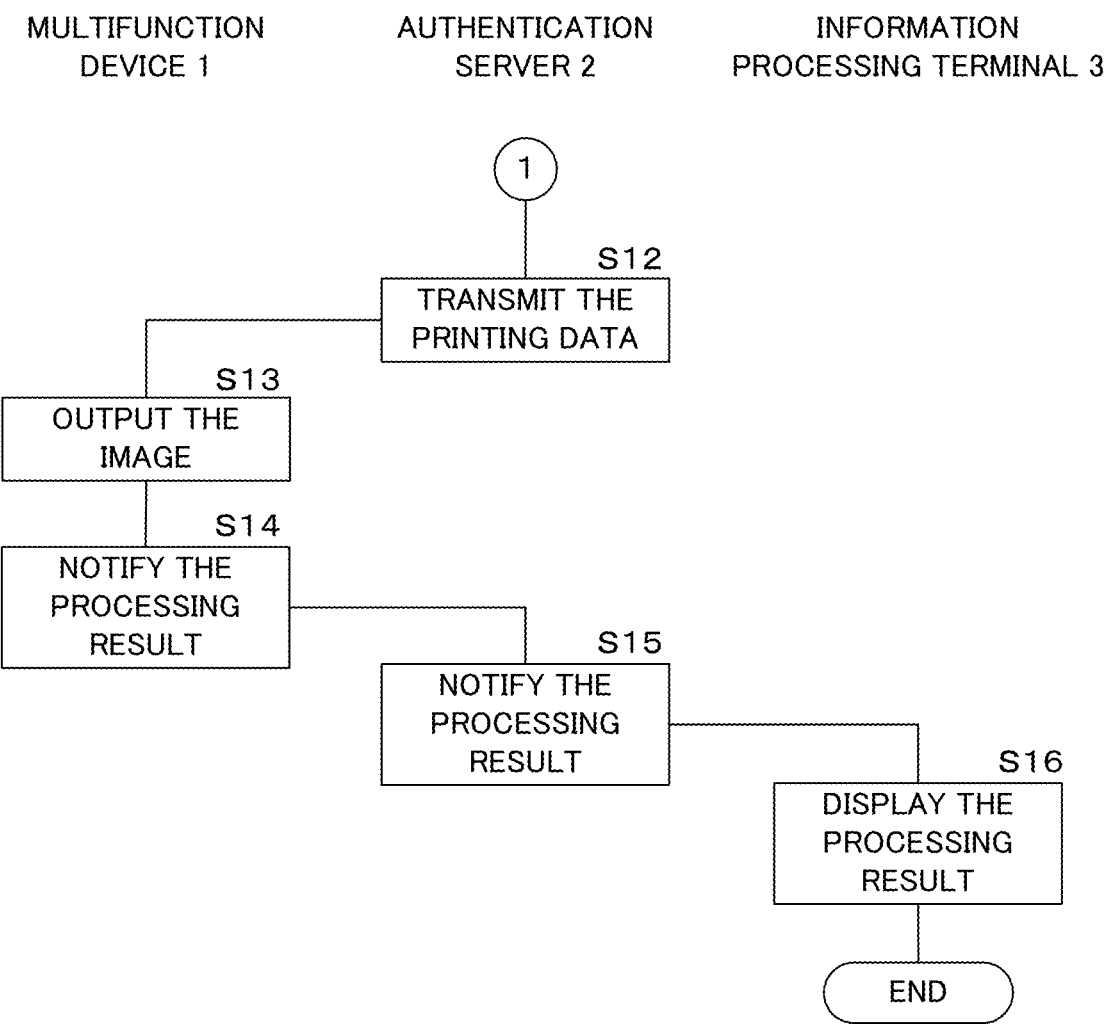
FIG. 6 is a flowchart illustrating the procedure of the printing processing by the image output system.

Hereinafter, when the user (instructor) using the print service instructs the printing processing to be executed by the multifunction device 1 using the information processing terminal 3, the processing performed by each device will be described. FIGS. 5 and 6 are flowcharts illustrating a procedure of printing processing by the image output system.

Further, the printing data are considered to be registered in the electronic data DB 21a of the authentication server 2 in advance. Further, in FIGS. 5 and 6, the left processing represents the processing executed by the multifunction device 1, the central processing represents the processing executed by the authentication server 2, and the right processing represents the processing executed by the information processing terminal 3.

The user using the print service accesses the authentication server 2 providing the print service using the information processing terminal 3. Further, the authentication server 2 also has a function as a web server. The information processing terminal 3 obtains a predetermined web page from the authentication server 2 and displays a printing request screen on the display unit 32b based on the obtained web page (S1).

Figure 7:
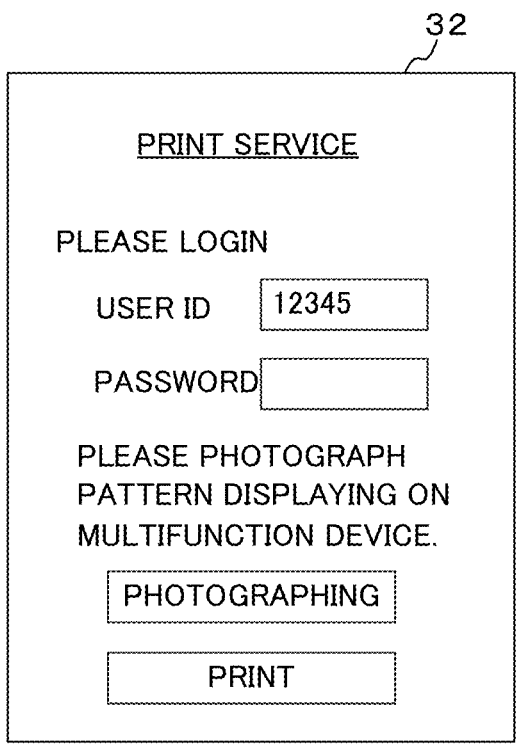
FIG. 7 is a schematic view illustrating a configuration example of a printing request screen.

FIG. 7 is a schematic view illustrating a configuration example of the printing request screen. In the printing request screen illustrated in FIG. 7, an input column for inputting the user ID and the password of the user who desires to use the print service, a photographing button, and a print button are displayed. Further, as a method of obtaining the information of the multifunction device 1 using the information processing terminal 3 in the present service, a description of the fact that the user photographs the pattern displayed on the multifunction device 1 by using the image obtaining unit 33 of the information processing terminal 3 is displayed in the vicinity of the photographing button.

Figure 8:
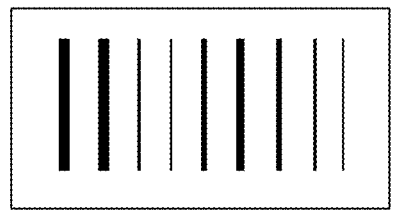
FIG. 8 is a schematic view illustrating an example of a code pattern of information of the multifunction device.

FIG. 8 is a schematic view illustrating an example of a code pattern of information of the multifunction device. The code pattern of the information of the multifunction device are a pattern obtained by coding the information of the multifunction device required to specify the multifunction device 1, and may be a bar code, a QR code (registered mark) or the like. According to Embodiment 1, as the information of the multifunction device, a multifunction device ID assigned to the multifunction device 1 is used. Further, if the information of the multifunction device is information which can specify the multifunction device 1, any information such as the network identification information of the host name, the IP address, the MAC address and the like assigned to the multifunction device 1, a name given to the multifunction device 1, and information relating to the installation place (convenience store) of the multifunction device 1 may be used, and one or a plurality of information may be used. Further, the code pattern may be displayed on the operation panel 11 (display unit 11b) of the multifunction device 1 and may be printed on paper so as to be attached onto an appropriate position of the multifunction device 1.

When the user operates the operation panel 32 of the information processing terminal 3 to input his/her own user ID and the password, the control unit (user information obtaining unit) 30 obtains the user ID and the password (user information for specifying the user) through the operation panel 32 (input unit 32a). Next, when the user operates the photographing button, the control unit (device information obtaining unit) 30 allows the image obtaining unit 33 to be converted into the imaging mode, and photographs the code pattern as illustrated in FIG. 8 to obtain the information (image data) of the code pattern. The user photographs the code pattern, and then operates the print button to request the printing execution by a desired multifunction device 1 to the authentication server 2. The control unit 30 of the information processing terminal 3 transmits the obtained information of the code pattern, the user ID, and the password (hereinafter, collectively referred to as authentication information) to the authentication server 2 through the communication unit (transmitting unit) 34 (S2).

The control unit 20 of the authentication server 2 obtains the information of the code pattern and the authentication information through the communication unit 22 and performs the authentication processing by the user authentication unit (authentication unit) 26 based on the obtained authentication information (S3). The user authentication unit 26 determines (authenticates) whether the user is a proper user registered as a user in advance based on whether the obtained authentication information is registered in the user information DB 21c (S4). When the user is not authenticated (NO in S4), that is, is not a proper user, the control unit 20 notifies the information processing terminal 3 of the authentication error representing the fact that the authentication fails, through the communication unit 22 (S5). In this case, the control unit 20 of the authentication server 2 discards the information of the code pattern and the authentication information which are obtained from the information processing terminal 3.

In the information processing terminal 3 that received the authentication error, the control unit 30 displays, for example, the authentication error on the operation panel 32 (S6), and ends the processing.

When the user is authenticated (YES in S4), that is, is a proper user, the control unit 20 of the authentication server 2 decodes the information of the code pattern obtained from the information processing terminal 3 (S7), and obtains the information (multifunction device ID) of the multifunction device. Further, the multifunction device management unit (specifying unit) 25 specifies the multifunction device 1 based on the information of the multifunction device obtained by decoding and the registration information of the multifunction device information DB 21b (S8). The control unit 20 of the authentication server 2 determines whether the multifunction device 1 is specified by the multifunction device management unit 25 (S9). When the multifunction device 1 is not specified (NO in S9), that is, the obtained information of the multifunction device is not registered in the multifunction device information DB 21b, or when the code pattern are not decoded, the control unit 20 notifies the information processing terminal 3 of the specification error representing the fact that the multifunction device 1 fails to be specified, through the communication unit 22 (S10). In this case, the control unit 20 of the authentication server 2 discards the information of the code pattern and the authentication information which are obtained from the information processing terminal 3.

In the information processing terminal 3 that received the specification error, the control unit 30 displays, for example, the specification error on the operation panel 32 (S11), and ends the processing.

When the multifunction device 1 is specified (YES in S9), the control unit 20 of the authentication server 2 reads the printing data stored in the electronic data DB 21a in association with the user (user ID) authenticated in step S3 by the storage processing unit 24. Further, the control unit 20 transmits the printing data read from the electronic data DB 21a to the multifunction device 1 specified in step S8 (S12), and instructs the multifunction device 1 to execute the printing processing. Thereby, the printing processing, which was instructed to be executed by the user using the information processing terminal 3, can execute.

Further, when the destination information (IP address) of the multifunction device 1 is, for example, included in the code pattern (information of the multifunction device) photographed by the image obtaining unit 33 of the information processing terminal 3, the authentication server 2 can obtain the destination of the multifunction device 1 from the code pattern. Further, when the IP address is not included in the code pattern, the authentication server 2 may obtain the IP address corresponding to the information (multifunction device ID) of the multifunction device obtained from the code pattern from the multifunction device information DB 21b to obtain the destination of the multifunction device 1.

The control unit 10 of the multifunction device 1 obtains the printing data through the communication unit 14, and outputs the image based on the obtained printing data by the image forming unit 13 (S13). Thereby, the authenticated user can use the multifunction device 1, and the printing processing of the multifunction device 1 instructed by the authenticated user may be executed.

After the image output ends, the control unit 10 of the multifunction device 1 notifies the authentication server 2 of the processing result through the communication unit 14 (S14). The control unit 20 of the authentication server 2 receiving the processing result notifies the information processing terminal 3 of the processing result by the multifunction device 1 through the communication unit 22 (S15). The control unit 30 of the information processing terminal 3 displays the notified processing result on, for example, the operation panel 32 (S16), and notifies the user using the information processing terminal 3 of the notified processing result. Thereby, the user instructing the printing processing (image output) to be executed by the multifunction device 1 using the information processing terminal 3 may know whether the printing processing has appropriately ended.

As described above, in the image output system according to Embodiment 1, when the user requests the use permission (user authentication) of the multifunction device 1 to the authentication server 2 using the information processing terminal 3, it is not necessary to know the destination information of the multifunction device 1 in advance. Further, the user may easily obtain the information of the multifunction device 1 by photographing the code pattern displayed on (or attached to) the multifunction device 1 using the image obtaining unit 33 of the information processing terminal 3, and therefore may easily use the multifunction device 1.

In the image output system according to Embodiment 1, since the low security risk information such as the multifunction device ID, the name of the multifunction device 1 and the information relating to the installation place of the multifunction device 1 is used as the information of the multifunction device, the information of the multifunction device transmitted from the information processing terminal 3 to the authentication server 2 does not include the network identification information such as the host name, the IP address, and the MAC address of the multifunction device 1. Therefore, since secret information such as the network identification information is not transmitted on the network, illegal obtainment of the secret information can be prevented, and thus security risks can be reduced.

Further, the information of the multifunction device may include the destination information (network identification information) of the multifunction device 1. In this case, since the information processing terminal 3 can obtain the destination information of the multifunction device 1 from the information (image data) obtained by photographing the code pattern, the authentication server 2 need not manage the destination information of the multifunction device 1 in advance. The information of the multifunction device 1 is displayed on (or attached to) the multifunction device 1 in a type of code pattern, and therefore even when the information of the multifunction device includes the destination information of the multifunction device 1, the careless leakage of the destination information (secret information) of the multifunction device 1 can be suppressed, and thus the security can be maintained.

(Embodiment 2)

Hereinafter, an image output system according to Embodiment 2 will be described. The image output system according to Embodiment 2 has the same configuration as the above-described image output system according to Embodiment 1, and therefore the same components are denoted by the same reference numerals and a detailed description thereof will be omitted.

Figure 9:
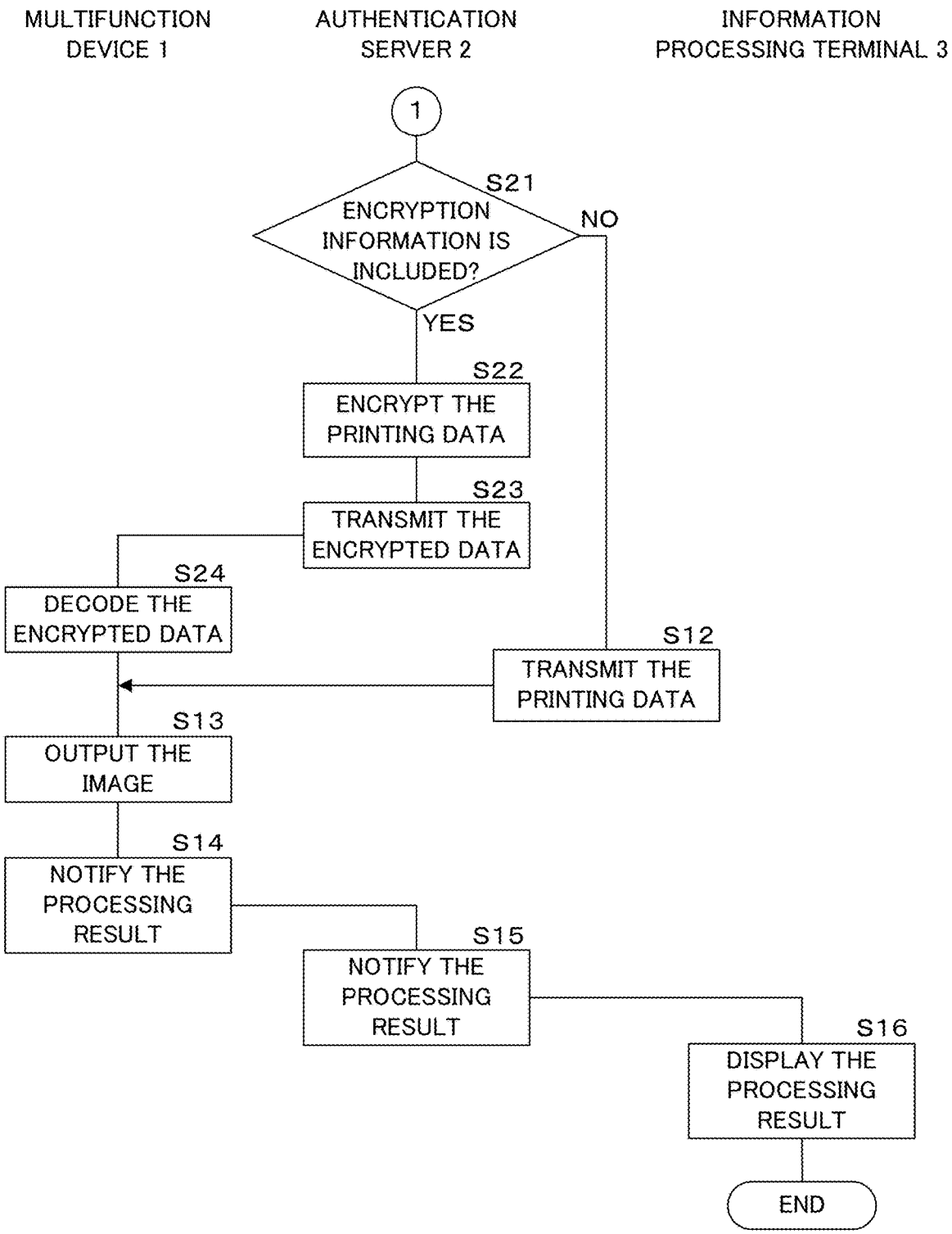
FIG. 9 is a flowchart illustrating a procedure of printing processing by an image output system according to Embodiment 2.

FIG. 9 is a flowchart illustrating a procedure of printing processing by the image output system according to Embodiment 2. Further, in FIG. 9, the left processing represents the processing executed by the multifunction device 1, the central processing represents the processing executed by the authentication server 2, and the right processing represents the processing executed by the information processing terminal 3.

In the image output system according to Embodiment 2, the authentication server 2 and the information processing terminal 3 perform the same processings as steps S1 to S11 in the flowchart illustrated in FIG. 5. Further, in step S9, when the multifunction device management unit 25 of the authentication server 2 specifies the multifunction device 1 based on the information of the multifunction device (YES in S9), the control unit 20 of the authentication server 2 determines whether encryption information is included in the information of the multifunction device obtained by the decoding in step S7 (S21).

The encryption information is information of an encryption key corresponding to a decoding key used in the decoding processing which can be executed by the multifunction device 1, and is included in the information of the multifunction device in advance. For example, in the image output system, when data are transmitted between the authentication server 2 and the multifunction device 1 without being encrypted or when a level of the communication security between the authentication server 2 and the multifunction device 1 is low, the encryption information is included in the information of the multifunction device.

When it is determined that the encryption information is not included in the information of the multifunction device (NO in S21), the control unit 20 of the authentication server 2 performs the same processing as step S12 in the flowchart illustrated in FIG. 6. Thereafter, the multifunction device 1, the authentication server 2, and the information processing terminal 3 performs the same processings as steps S13 to S16 in the flowchart illustrated in FIG. 6.

Meanwhile, when it is determined that the encryption information is included in the information of the multifunction device (YES in S21), the control unit 20 of the authentication server 2 reads the printing data stored in the electronic data DB 21a in association with the user (user ID) authenticated in step S3 by the storage processing unit 24. Further, the control unit 20 encrypts the read printing data using the encryption information included in the information of the multifunction device (S22), and transmits the encrypted data to the multifunction device 1 specified in step S8 (S23). Thereby, the printing data are safely transmitted from the authentication server 2 to the multifunction device 1.

The control unit 10 of the multifunction device 1 obtains the encrypted data through the communication unit 14, decodes the obtained encrypted data using the decoding information (decoding key) previously kept by the multifunction device 1 (S24), and outputs the image by the image forming unit 13 based on the obtained printing data (S13). Further, next, the multifunction device 1, the authentication server 2, and the information processing terminal 3 performs the same processings as steps S14 to S16 in the flowchart illustrated in FIG. 6.

As described above, in the image output system according to Embodiment 2, since the printing data transmitted from the authentication server 2 to the multifunction device 1 are encrypted, even when the data are leaked during the transmission, it is possible to prevent the information from leaking. Further, since the encryption information corresponding to the multifunction device 1 is included in the information of the multifunction device in advance, by photographing the code pattern of the information of the multifunction device using the image obtaining unit 33 of the information processing terminal 3, the user can obtain the encryption information.

In the image output systems according to the Embodiments 1 and 2, since the user registers the printing data in the authentication server 2 in advance, when the user requests the authentication (printing instruction) to the authentication server 2 actually using the information processing terminal 3, only the information of the code pattern (the information of the multifunction device) and the authentication information may be transmitted to the authentication server 2. By this configuration, in Embodiments 1 and 2, there is no need to store the printing data in the information processing terminal 3, and the amount of data transmitted from the information processing terminal 3 to the authentication server 2 can be reduced.

In addition to the above-described configuration, when the user requests the authentication (printing instruction) to the authentication server 2 using the information processing terminal 3, the printing data may be transmitted to the authentication server 2, along with the information of the code pattern and the authentication information. In this case, there is no need to manage the printing data for each user by the authentication server 2, and thus the processing burden of the authentication server 2 may be reduced.

In addition, when the user registers the plurality of printing data in the authentication server 2 in advance, the user may request the authentication to the authentication server 2 using the information processing terminal 3, and when the user is authenticated, the user may select the desired printing data. In detail, when the user using the print service accesses the authentication server 2 using the information processing terminal 3 to obtain the predetermined web page, a printing request screen as illustrated on the upper side of FIG. 10 may be displayed on the display unit 32b of the information processing terminal 3. FIG. 10 is a schematic view illustrating a modified example of the printing request screen. Similar to the printing request screen illustrated in FIG. 7, the input column for inputting the user ID and the password and the login button are displayed on the printing request screen illustrated on the upper side of FIG. 10.

The user operates the operation panel 32 of the information processing terminal 3 to input his/her own user ID and the password, and operates the login button. The information processing terminal 3 transmits the user ID and the password (authentication information) obtained through the printing request screen to the authentication server 2, and the authentication server 2 authenticates the obtained authentication information based on the registration contents of the user information DB 21c. When the user is authenticated, the authentication server 2 transmits the web page for displaying the printing request screen illustrated on the lower side of FIG. 10 to the information processing terminal 3, and the information processing terminal 3 displays the printing request screen as illustrated on the lower side of FIG. 10 on the display unit 32*b* based on the obtained web page.

The printing request screen illustrated on the lower side of FIG. 10 displays file names, registered dates for each of the plurality of printing data previously registered in the authentication server 2 by the logged-in user, and check boxes for selecting each printing data, in association with one another. Further, the check box may be configured to select the plurality of printing data. Further, the printing request screen illustrated on the lower side of FIG. 10 displays a description of the fact that the user photographs the pattern displayed on the multifunction device 1 by using the image obtaining unit 33 of the information processing terminal 3, the photographing button, and the print button.

The user checks the check box of the printing data to be printed by operating the operation panel 32 of the information processing terminal 3, operates the photographing button, and photographs the code pattern displayed by the multifunction device 1. The user photographs the code pattern, and then operates the print button to request the printing execution by the desired multifunction device 1 to the authentication server 2. Thereby, the user can transmit the information representing the printing data to be printed to the authentication server 2, along with the information of the code pattern. By the above-described configuration, the data to be printed can be selected from the plurality of printing data registered in the authentication server 2 using the information processing terminal 3, and therefore the operability is improved.

The image output systems according to Embodiments 1 and 2 are configured to display or attach the code pattern of the information of the multifunction device on the multifunction device 1 in advance. In addition to the above-described configuration, the authentication server 2 may be configured to generate the code pattern of the information of the multifunction device based on the registration information of the multifunction device information DB 21*b*. In detail, the authentication server 2 manages the multifunction device information DB 21*b*, and therefore the control unit 20 generates the code pattern using a part of the registration information of the multifunction device information DB 21*b*. The control unit 10 of the multifunction device 1 obtains the code pattern generated by the authentication server 2 through the communication unit 14, and displays the obtained code pattern on the display unit 11*b* to notify (present) the user. In this case, the authentication server 2 manages the information of the IP address and the like of the multifunction device 1, and therefore the information of the multifunction device needs not include the network identification information such as the IP address. Therefore, even when the information of the code pattern transmitted from the information processing terminal 3 to the authentication server 2 is leaked, the leakage of secret information such as the network identification information may be prevented.

Further, the user may instruct the authentication server 2 to execute the processing of generating the code pattern through the operation panel 11 of the multifunction device 1. In this case, whenever the control unit 10 of the multifunction device 1 receives the instruction for generation of the code pattern from the user, the control unit 10 requests the generation of the code pattern to the authentication server 2, and obtains the generated code pattern from the authentication server 2. Since the authentication server 2 generates the code pattern, it is possible to manage the code pattern of each multifunction device 1 at the authentication server 2 at one time, and the multifunction device 1 needs not to have the function of generating the code pattern. Further, when the code pattern are generated using the information (information of the multifunction device) which is likely to be appropriately changed, the user can request the multifunction device 1 to execute the printing processing using the latest code pattern.

(Embodiment 3)

Hereinafter, an image output system according to Embodiment 3 will be described. The image output system according to Embodiment 3 has the same configuration as the above-described image output system according to Embodiment 1, and therefore the same components are denoted by the same reference numerals and a detailed description thereof will be omitted.

In the image output systems according to Embodiments 1 and 2, the code pattern of the information of the multifunction device displays or attaches on the multifunction device 1 in advance.

Compared with these, in the image output system according to Embodiment 3, the multifunction device 1 generates the code pattern of its own information of the multifunction device, and displays the generated code pattern on the operation panel 11. Further, when generating the code pattern, the multifunction device 1 generates the code pattern by coding the printing conditions to be set by the user in addition to the information (for example, multifunction device ID) of the multifunction device.

In detail, the user who desires to use the multifunction device 1 operates the operation panel 11 of the multifunction device 1 to set the desired printing conditions, and operates, for example, a 'code pattern generating' button (not illustrated) displayed on the operation panel 11. When the code pattern generating button is operated, the control unit 10 of the multifunction device 1 codes the predetermined information of the multifunction device and the printing conditions set by the user, and displays the generated code pattern on the operation panel 11 (display unit 11*b*) to notify (present) the user. The printing conditions are the setting conditions relating to the processing which can be executed by the multifunction device 1, such as execution of N-up printing, execution of color printing, and execution of black and white printing.

Further, the operation of inputting the user information (authentication information) through the printing request screen (see FIG. 7) and the operation of obtaining the information (image data) of the code pattern by imaging the code pattern displayed on the multifunction device 1 by the image obtaining unit 33 of the information processing terminal 3 are the same as Embodiment 1. In addition, the processing of the authentication server 2 authenticating the user based on the user information obtained from the information processing terminal 3 is also the same as Embodiment 1.

Figure 11:
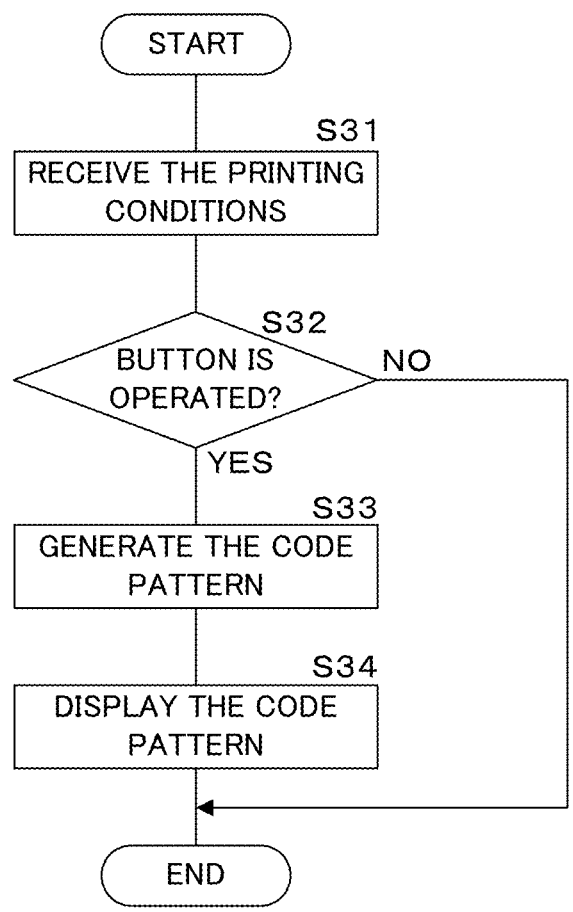
FIG. 11 is a flowchart illustrating a procedure of code pattern generating processing by a multifunction device according to Embodiment 3.

FIG. 11 is a flowchart illustrating a procedure of code pattern generating processing by a multifunction device 1 according to Embodiment 3.

The user using the print service operates the operation panel 11 of the multifunction device 1 to set the desired printing conditions. The control unit 10 of the multifunction device 1 receives the printing conditions set by the user through the operation panel 11 (S31). The control unit 10 determines whether the predetermined button such as the code pattern generating button is operated by the user (S32), and when the predetermined button is not operated (NO in S32), for example, when a cancel button is operated, ends the processing.

When the predetermined button is operated (YES in S32), the control unit 10 codes the predetermined information (multifunction device ID) of the multifunction device and the received printing conditions to generate the code pattern (S33). Further, the control unit 10 displays the generated code pattern on the operation panel 11 (S34), and ends the processing. Further, the predetermined information of the multifunction device, that is, the information for each multifunction device 1 is stored in the storage unit (not illustrated) in advance. Further, the method of generating the code pattern are not particularly limited, and therefore any method may be used.

Figure 12:
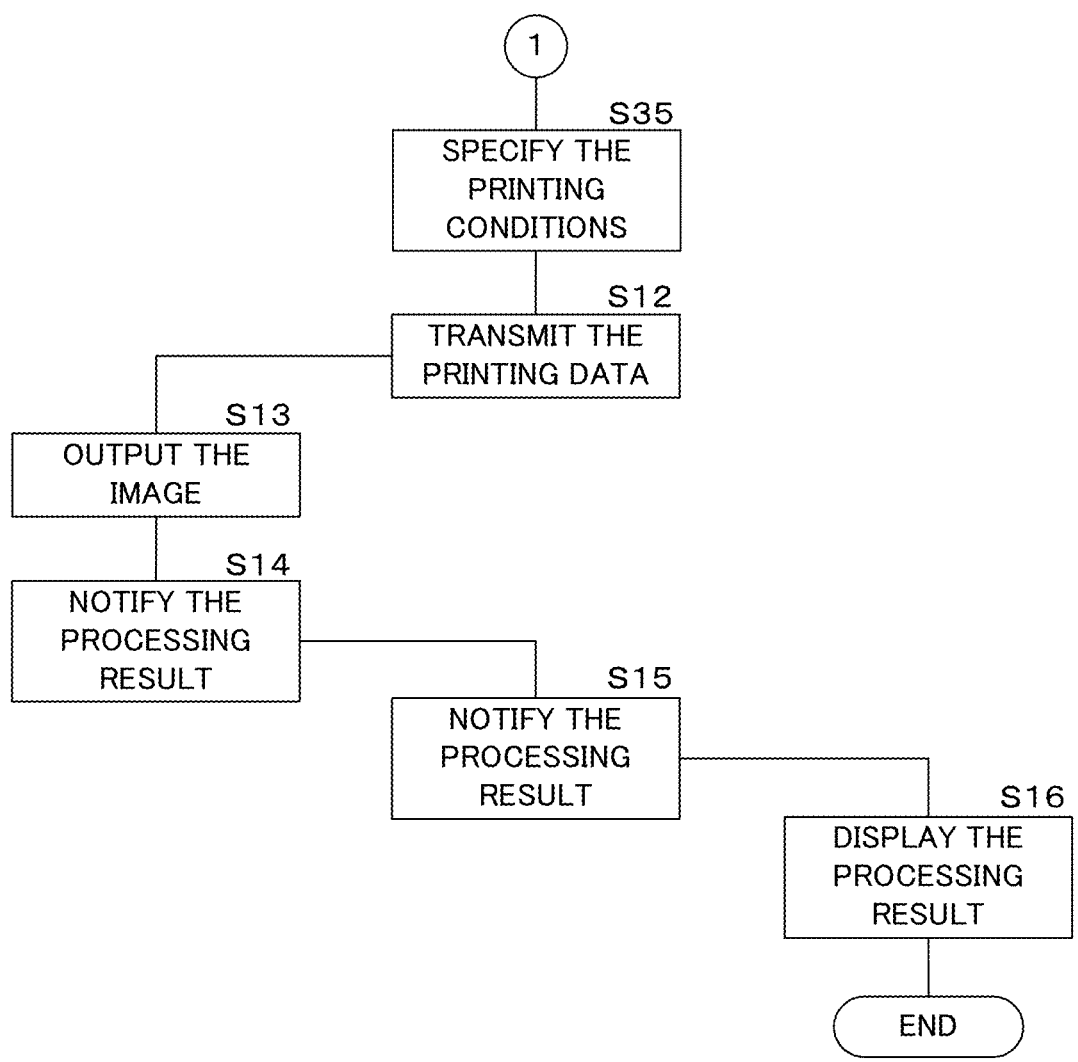
FIG. 12 is a flowchart illustrating a procedure of printing processing by an image output system according to Embodiment 3.

FIG. 12 is a flowchart illustrating a procedure of printing processing by the image output system according to Embodiment 3. Further, in FIG. 12, the left processing represents the processing executed by the multifunction device 1, the central processing represents the processing executed by the authentication server 2, and the right processing represents the processing executed by the information processing terminal 3.

In the image output system according to Embodiment 3, the authentication server 2 and the information processing terminal 3 perform the same processings as steps S1 to S11 in the flowchart illustrated in FIG. 5. Further, in step S9, when the multifunction device management unit 25 of the authentication server 2 specifies the multifunction device 1 based on the information of the multifunction device (YES in S9), the control unit 20 of the authentication server 2 specifies the printing conditions from the information obtained by the decoding in step S7 (S35). Moreover, according to Embodiment 3, since the information of the multifunction device and the printing conditions are included in the code pattern, the control unit 20 of the authentication server 2 can obtain the information of the multifunction device and the printing conditions when the code pattern are decoded in step S7.

The control unit 20 of the authentication server 2 reads the printing data stored in the electronic data DB 21a in association with the user (user ID) authenticated in step S3 by the storage processing unit 24. Further, the control unit 20 transmits the printing data read by the electronic data DB 21a to the multifunction device 1 specified in step S8 (S12). In this case, the control unit 20 transmits the execution instruction of the printing processing within the printing conditions specified in step S35 to the multifunction device 1, along with the printing data. Thereby, the printing processing can be executed under the conditions set by the user.

The control unit 10 of the multifunction device 1 obtains the printing data and the printing conditions through the communication unit 14 and the image forming unit 13 performs the printing processing (image output) on the obtained printing data under the obtained printing conditions (S13). Thereafter, the multifunction device 1, the authentication server 2, and the information processing terminal 3 performs the same processings as steps S14 to S16 in the flowchart illustrated in FIG. 6.

As described above, in the image output system according to Embodiment 3, as the information of the code pattern transmitted from the information processing terminal 3 to the authentication server 2, not only the information of the multifunction device but also the printing conditions are included. Therefore, the user photographs the code pattern of the multifunction device 1 using the image obtaining unit 33 of the information processing terminal 3 and transmits the photographed code pattern to the authentication server 2 to be able to instruct the execution of the printing processing under the desired printing conditions. A conventional system is configured to display the predetermined printing condition setting screen on the information processing terminal 3, when the user inputs the desired printing conditions to the information processing terminal 3, the information processing terminal 3 transmits the inputted printing condition to the authentication server 2. However, according to Embodiment 3, the user operates the operation panel 11 of the multifunction device 1 to set the printing condition, photographs the code pattern including the set printing conditions using the information processing terminal 3, and transmits the obtained information to the authentication server 2, thereby can transmit the desired printing condition to the authentication server 2. Therefore, since the user operates only the multifunction device 1, burden of the operation for setting the printing condition can be reduced.

Although Embodiment 3 describes, by way of example, a configuration of coding the information of the multifunction device and the printing conditions by the multifunction device 1, the multifunction devices 1 according to Embodiments 1 and 2 may include a configuration of coding the information of the multifunction device.

The authentication server 2 according to Embodiment 3 is configured to transmit the execution instruction of the printing processing within the printing conditions (printing conditions set by allowing the user to operate the multifunction device 1) obtained from the information processing terminal 3 to the multifunction device 1, but it is not limited to the above-described configuration.

For example, the authentication server 2 manages the printing conditions relating to the printing processing, which can be actually executed by each multifunction device 1, based on the multifunction device information DB 21b (see FIG. 4). Therefore, the authentication server 2 may be configured to specify the printing conditions actually instructed to the multifunction device 1 based on the printing conditions obtained from the information processing terminal 3 and the registration information of the multifunction device information DB 21b.

In detail, the control unit 20 of the authentication server 2 determines whether the printing conditions included in the information obtained from the information processing terminal 3 coincide with the printing conditions (usable setting) registered in the multifunction device information DB 21b. If it is determined that both of the printing conditions coincide with each other, the control unit 20 specifies the printing conditions included in the information obtained from the information processing terminal 3 as the printing conditions actually instructed to the multifunction device 1. If it is determined that both of the printing conditions do not coincide with each other, for example, when the printing conditions obtained from the information processing terminal 3 are the execution of the color printing and the printing conditions registered in the multifunction device information DB 21b are the execution of the black and white printing, the control unit 20 specifies the execution of the black and white printing as the printing conditions actually instructed to the multifunction device 1. Further, the control unit 20 transmits the execution instruction of the printing processing under the specified printing conditions to the multifunction device 1, along with the printing data. Thereby, for example, even when the printing conditions which cannot be actually executed by the multifunction device 1 are transmitted from the information processing terminal 3, the authentication server 2 changes the printing conditions to the printing conditions which can be actually executed by the multifunction device 1, and then transmits the execution instruction of the printing processing to the multifunction device 1, thereby it is possible to reliably execute the printing processing.

Further, the authentication server 2 manages the printing conditions (usable setting) which are permitted to each user based on the user information DB 21c (see FIG. 4). Therefore, the authentication server 2 may be configured to specify the printing conditions actually instructed to the multifunction device 1 based on the printing conditions obtained from the information processing terminal 3 and the registration information of the user information DB 21c.

In detail, the control unit 20 of the authentication server 2 determines whether the printing conditions included in the information obtained from the information processing terminal 3 coincide with the printing conditions registered in the user information DB 21c for the user. If it is determined that both of the printing conditions coincide with each other, that is when the printing conditions requested by the user are the printing conditions which are permitted to the user, the control unit 20 specifies the printing conditions included in the information obtained from the information processing terminal 3 as the printing conditions actually instructed to the multifunction device 1. If it is determined that both of the printing conditions do not coincide with each other, for example, when the printing conditions requested by the user are N-up printing and the printing conditions which are permitted to the user are 1-up printing, the control unit 20 specifies the execution of the 1-up printing as the printing conditions actually instructed to the multifunction device 1. Further, the control unit 20 transmits the execution instruction of the printing processing under the specified printing conditions to the multifunction device 1, along with the printing data. Thereby, the printing conditions which can be executed for each user can be limited, and the printing processing within the printing conditions permitted to each user can be reliably executed.

(Embodiment 4)

Hereinafter, an image output system according to Embodiment 4 will be described. The image output system according to Embodiment 4 has the same configuration as the above-described image output system according to Embodiment 3, and therefore the same components are denoted by the same reference numerals and a detailed description thereof will be omitted.

The image output system according to Embodiment 4 has a configuration in which the multifunction device 1 generates the code pattern of its own information of the multifunction device, and when generating the code pattern, generates the code pattern including the status information relating to the operation state of the multifunction device 1 as well as the information (for example, multifunction device ID) of the multifunction device.

In detail, the control unit 10 of the multifunction device 1 monitors the operation state of the multifunction device 1, and for example, monitors the occurrence of any error such as 'running out of ink', 'inexecutable of the N-up printing', 'occurrence of paper jamming'. When any error occurs, the control unit 10 codes the predetermined information of the multifunction device and the information representing the occurring error, and displays the code pattern on the operation panel 11 (display unit 11b) to notify (present) the user.

Figure 13:
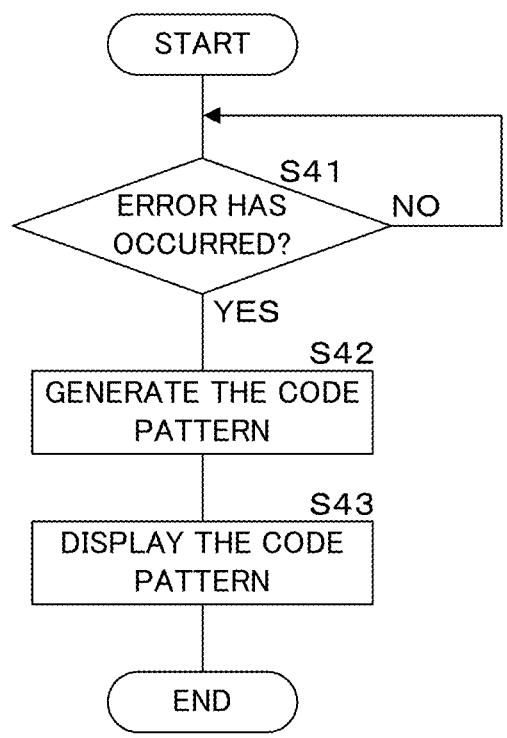
FIG. 13 is a flowchart illustrating a procedure of code pattern generating processing by a multifunction device according to Embodiment 4.

FIG. 13 is a flowchart illustrating a procedure of code pattern generating processing by the multifunction device 1 according to Embodiment 4.

The control unit 10 of the multifunction device 1 determines whether any error has occurred in the multifunction device 1 (S41), and when an error has not occurred (NO in S41), performs other processings until an error occurs and is in a standby state.

When an error occurs (YES in S41), the control unit 10 of the multifunction device 1 codes the predetermined information (multifunction device ID) of the multifunction device and the information representing the occurred error, and generates the code pattern (S42). In addition, the control unit 10 displays the generated code pattern on the operation panel 11 (S43), and ends the processing. Further, the predetermined information of the multifunction device and the information representing the error are stored in the storage unit (not illustrated) in advance.

Figure 14:
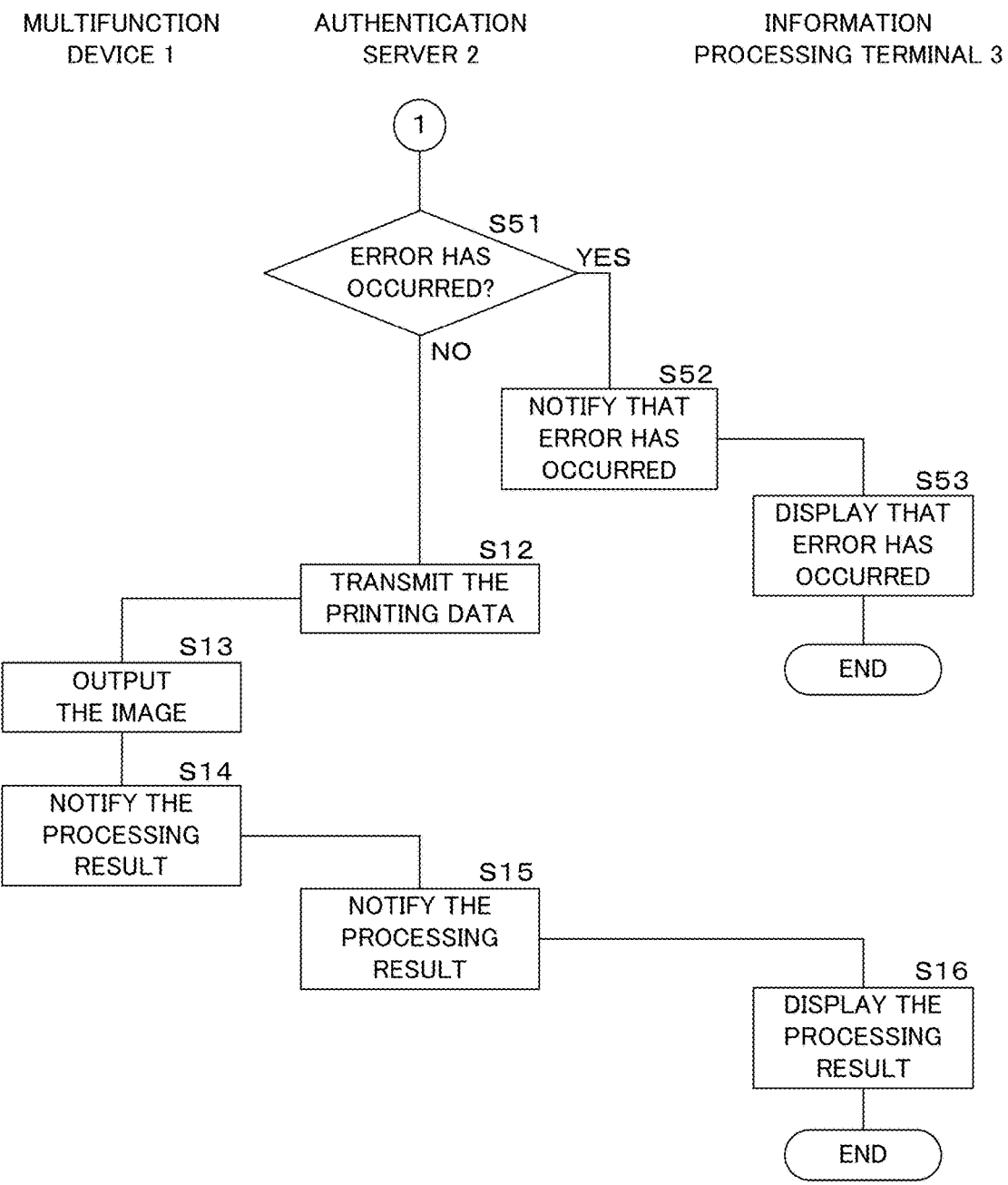
FIG. 14 is a flowchart illustrating a procedure of printing processing by an image output system according to Embodiment 4.

FIG. 14 is a flowchart illustrating a procedure of printing processing by the image output system according to Embodiment 4. Further, in FIG. 14, the left processing represents the processing executed by the multifunction device 1, the central processing represents the processing executed by the authentication server 2, and the right processing represents the processing executed by the information processing terminal 3.

In the image output system according to Embodiment 4, the authentication server 2 and the information processing terminal 3 perform the same processings as steps S1 to S11 in the flowchart illustrated in FIG. 5. Further, in step S9, when the multifunction device management unit 25 of the authentication server 2 specifies the multifunction device 1 based on the information of the multifunction device (YES in S9), the control unit 20 of the authentication server 2 determines whether an error has occurred in the multifunction device 1 based on the information obtained by the decoding in step S7 (S51). Moreover, according to Embodiment 4, since the information of the multifunction device and the information representing the error are included in the code pattern, the control unit 20 of the authentication server 2 can obtain the information of the multifunction device and the information representing the error when the code pattern are decoded in step S7.

When it is determined that an error has not occurred in the multifunction device 1 (NO in S51), the control unit 20 of the authentication server 2 performs the same processing as step S12 in the flowchart illustrated in FIG. 6. Thereafter, the multifunction device 1, the authentication server 2, and the information processing terminal 3 performs the same processings as steps S13 to S16 in the flowchart illustrated in FIG. 6.

Meanwhile, if it is determined that an error has occurred in the multifunction device 1 (YES in S51), the control unit 20 of the authentication server 2 notifies the information processing terminal 3 of the fact that an error has occurred in the multifunction device 1, from the communication unit 22 (S52). In the information processing terminal 3 to which the occurrence of an error is notified, the control unit 30 displays the fact that an error has occurred in the multifunction device 1, for example, on the operation panel 32 (S53), and notifies the user of the occurrence of an error, and ends the processing. Thereby, the user instructing the printing processing (image output) to be executed by the multifunction device 1 using the information processing terminal 3 can understand that the multifunction device 1 cannot be used due to the occurrence of an error in the multifunction device 1. Further, the control unit 20 of the authentication server 2 may notify the information processing terminal 3 of a kind of the error occurring in the multifunction device 1.

As described above, in the image output system according to Embodiment 4, since the information transmitted from the information processing terminal 3 to the authentication server 2 includes the status information of the multifunction device 1, the authentication server 2 can understand the fact that an error has occurred in the multifunction device 1 at the time of requesting the authentication and the printing from the information processing terminal 3.

In a conventional system, the authentication server 2 cannot understand the occurrence of an error in the multifunction device 1 until the printing failure from the multifunction device 1 is notified with respect to the instruction after the authentication server 2 instructs the multifunction device 1 to execute the printing processing. However, according to Embodiment 4, the authentication server 2 can understand the occurrence of an error in the multifunction device 1 at the time of decoding the information obtained from the information processing terminal 3, and therefore can understand the occurrence of an error at an early stage and quickly take action against the error.

According to Embodiment 4, the authentication server 2 is configured to stop the printing processing by the multifunction device 1 when it is detected that an error has occurred in the multifunction device 1, and notify the information processing terminal 3 (user) of the fact that an error has occurred in the multifunction device 1. In addition to the configuration, for example, even when an error occurs in the multifunction device 1, if the printing processing which can be executed by the multifunction device 1 is present, the authentication server 2 may be configured to instruct the multifunction device 1 to execute the printing processing.

In detail, the authentication server 2 determines the operation state of the multifunction device 1 based on the status information obtained from the information processing terminal 3, and when running out of color ink in the multifunction device 1, determines whether the multifunction device 1 can perform the black and white printing based on the registration information of the multifunction device information DB 21b. Further, when the black and white printing can be performed, the authentication server 2 transmits the execution instruction of the black and white printing to the multifunction device 1. Thereby, even when an error has occurred in the multifunction device 1, the printing processing within the printing conditions which can be executed by the multifunction device 1 can be performed.

According to Embodiment 4, the information processing terminal 3 is configured to transmit the information obtained by imaging the code pattern to the authentication server 2, and the authentication server 2 is configured to decode the obtained information to obtain the information of the multifunction device and the status information of the multifunction device 1. In addition to the above-described configuration, the information processing terminal 3 may have a decoding function, and may be configured to decode the information obtained by photographing the code pattern. In this case, the control unit 30 of the information processing terminal 3 can determine whether an error has occurred in the multifunction device 1 based on the status information obtained by the decoding at the time of decoding the code pattern. Therefore, it is possible to detect an error and take action against the errors at an earlier stage. Further, in this case, the information processing terminal 3 may be configured to transmit the information of the multifunction device and the status information obtained by the decoding to the authentication server 2, and in the case of the configuration, processing burden of the authentication server 2 can be reduced.

Further, for example, the authentication server 2 may be configured to further include a component for notifying a terminal carried by a service worker managing the multifunction device 1 of the occurrence of the error when the authentication server 2 detects that an error has occurred in the multifunction device 1.

According to the above-described Embodiments 1 to 4, when the user requests the authentication (printing instruction) to the authentication server 2 using the information processing terminal 3, the image output system may be configured to simultaneously transmit the information (information of the multifunction device) of the code pattern and the authentication information from the information processing terminal 3 to the authentication server 2. Therefore, it is possible to easily associate the user information (authentication information) with the information of the multifunction device. Further, the user can perform the authentication request and the printing request, and therefore when the user is logged in to the authentication server 2, the operability is improved. By the above-described configuration, for example, even when the printing is performed using the multifunction device 1 (public printer) installed in a convenience store used for the first time, unnecessary time to operate the multifunction device 1 is not required, and the printed material may be quickly obtained.

In addition to the above-described configuration, for example, only the authentication information is first transmitted from the information processing terminal 3 to the authentication server 2, and as the result of the authentication processing by the authentication server 2, when the user is authenticated, the image output system may be configured to transmit the information of the code pattern from the information processing terminal 3 to the authentication server 2. Further, when the user requests the authentication, in the configuration in which the printing data are transmitted to the authentication server 2 along with the information of the code pattern and the authentication information, the image output system may be configured to first transmit the information of the code pattern to the authentication server 2, and when the multifunction device 1 is specified by the authentication server 2, transmit the printing data from the information processing terminal 3 to the authentication server 2.

In the information processing terminals 3 according to Embodiments 1 to 4, the user operates the operation panel 32 on the printing request screen to input the authentication information (user ID and password). In addition to the above-described configuration, for example, when the information processing terminal 3 has an IC card reader, the information processing terminal 3 may be configured to read the authentication information from the IC card storing the user ID and the password in advance.

(Embodiment 5)

Hereinafter, an image output system according to Embodiment 5 will be described. The image output system according to Embodiment 5 has the same configuration as the above-described image output systems according to Embodiment 1 to 4, and therefore the same components are denoted by the same reference numerals and a detailed description thereof will be omitted.

In the image output systems according to Embodiments 1 to 4, the user needs to perform the user registration for the print service in advance. In the image output system according to Embodiment 5, even though the user is not registered, the multifunction device 1 can be used.

In the multifunction device 1 according to Embodiment 5, for example, a 'trial print' button (not illustrated) is displayed on the operation panel 11. When the user who is not registered desires to use the multifunction device 1, the user operates the trial print button displayed on the operation panel 11. When the trial print button is operated, the control unit 10 of the multifunction device 1 codes the predetermined information (multifunction device ID) of the multifunction device and the printing permission information for temporarily permitting the use of the multifunction device 1, and displays the generated code pattern on the operation panel 11 (display unit 11b) to notify (present) the user.

Figure 15:
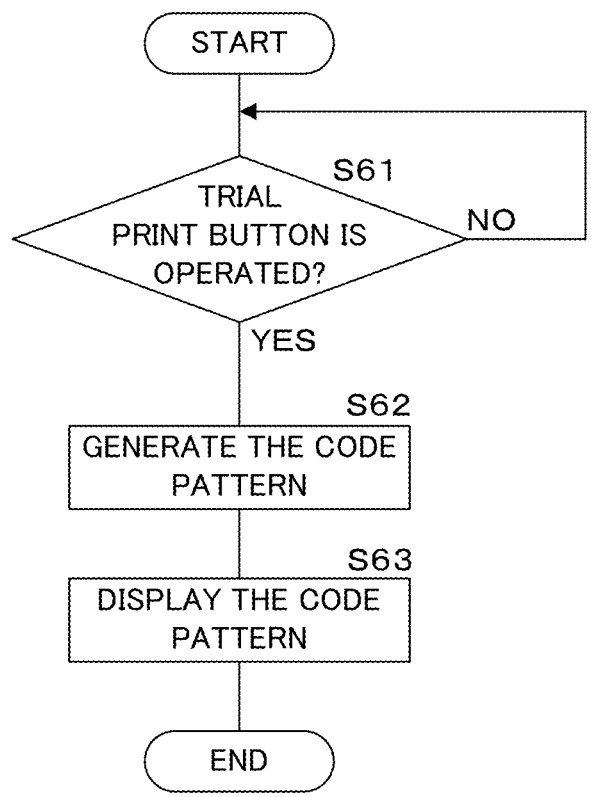
FIG. 15 is a flowchart illustrating a procedure of code pattern generating processing by a multifunction device according to Embodiment 5.

FIG. 15 is a flowchart illustrating a procedure of code pattern generating processing by the multifunction device 1 according to Embodiment 5.

The control unit 10 of the multifunction device 1 determines whether the trial print button of the operation panel 11 is operated by the user (S61), and when the trial print button is not operated (NO in S61), the control unit 10 of the multifunction device 1 performs other processings until the trial print button is operated and is in a standby state.

When the trial print button is operated (YES in S61), the control unit 10 codes the predetermined information (multifunction device ID) of the multifunction device and the permission information, and generates the code pattern (S62). Then, the control unit 10 displays the generated code pattern on the operation panel 11 (S63), and ends the processing. Further, the predetermined information of the multifunction device and the permission information are stored in the storage unit (not illustrated) in advance.

Figure 16:
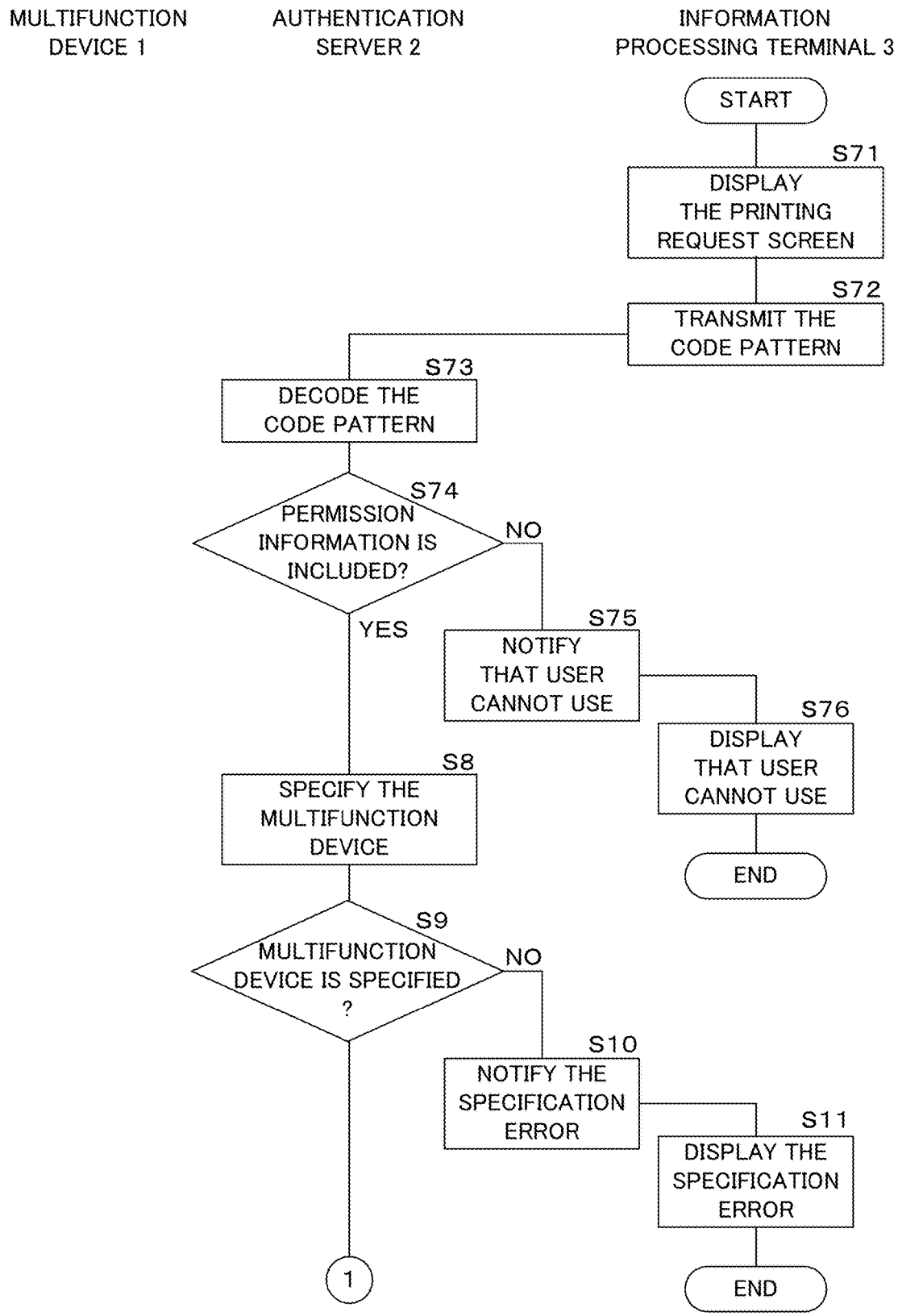
FIG. 16 is a flowchart illustrating a procedure of printing processing by an image output system according to Embodiment 5.

FIG. 16 is a flowchart illustrating a procedure of printing processing by the image output system according to Embodiment 5. Further, in FIG. 16, the left processing represents the processing executed by the multifunction device 1, the central processing represents the processing executed by the authentication server 2, and the right processing represents the processing executed by the information processing terminal 3.

In the image output system according to Embodiment 5, although the user is not registered, the user who desires to use the print service uses the information processing terminal 3 to access the authentication server 2 providing the print service. Further, the information processing terminal 3 obtains the predetermined web page from the authentication server 2, and displays a printing request screen on the display unit 32b based on the obtained web page (S71).

Figure 17:
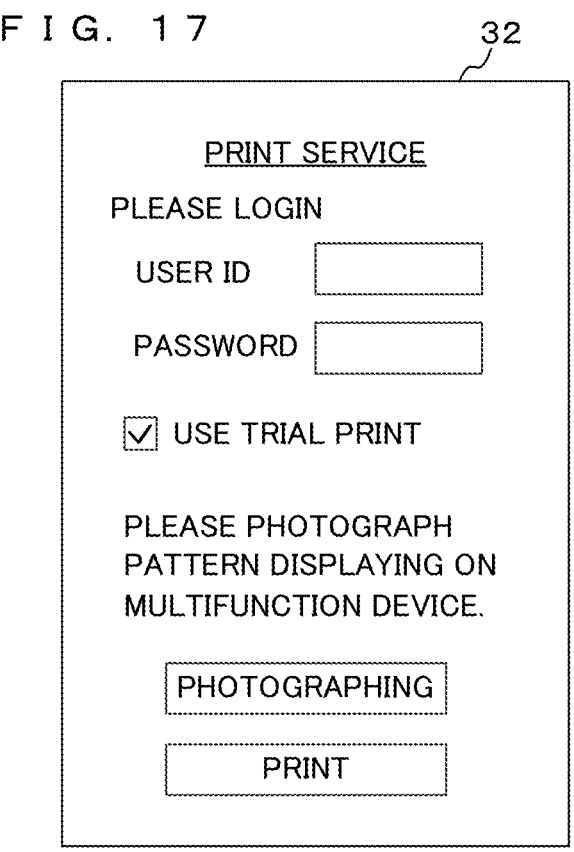
FIG. 17 is a schematic view illustrating a configuration example of the printing request screen.

FIG. 17 is a schematic view illustrating a configuration example of the printing request screen. In the printing request screen illustrated in FIG. 17, in addition to the input column for inputting the user ID and the password of the user who desires to use the print service, the photographing button, and the print button, a check box for selecting the 'use trial print' is displayed.

The user who is not registered operates the operation panel 32 of the information processing terminal 3 to check the check box of the 'use the trial print' instead of inputting the user ID and the password.

Meanwhile, the user operates the trial print button of the multifunction device 1 to display the code pattern coding the multifunction device ID and the permission information on the operation panel 11 of the multifunction device 1. Further, the user operates the photographing button of the printing request screen, and the control unit 30 of the information processing terminal 3 photographs the code pattern which is displayed on the multifunction device 1 using the image obtaining unit 33, and obtains the information (image data) of the code pattern. The user photographs the code pattern, and then operates the print button to request the printing execution by the multifunction device 1 to the authentication server 2.

When the check box of the 'use trial print' is checked on the printing request screen, the control unit 30 of the information processing terminal 3 transmits only the obtained information of the code pattern to the authentication server 2 through the communication unit 34 without waiting for the input of the user ID and the password (S72).

When obtaining only the information of the code pattern through the communication unit 22, the control unit 20 of the authentication server 2 decodes the obtained information of the code pattern (S73), and obtains the information (multifunction device ID) of the multifunction device and the permission information. The control unit 20 determines whether the permission information is included in the information obtained by the decoding (S74), and if it is determined that the permission information is not included in the information obtained by the decoding (NO in S74), notifies the information processing terminal 3 of the fact that the use of the multifunction device 1 cannot be permitted, through the communication unit 22 (S75). In this case, the control unit 20 of the authentication server 2 discards the information of the code pattern which is obtained from the information processing terminal 3.

In the information processing terminal 3 which is notified of the fact that the use of the multifunction device 1 cannot be permitted, the control unit 30 displays the fact on the operation panel 32 (S76), and ends the processing.

When the permission information is included in the information obtained by the decoding (YES in S74), the control unit 20 (multifunction device management unit 25) of the authentication server 2 specifies the multifunction device 1 based on the information of the multifunction device obtained by the decoding and the registration information of the multifunction device information DB 21b (S8). Thereafter, the multifunction device 1, the authentication server 2, and the information processing terminal 3 performs the same processings as steps S9 to S16 in the flowchart illustrated in FIGS. 5 and 6.

As described above, in the image output system according to Embodiment 5, even when the user is not registered in the print service and has no the use authority for the multifunction device 1, the user can receive the temporary use authority. Therefore, the user can use the trial print service provided by the image output system.

Further, the user ID and the password may be temporarily given to the user who requests the use of the multifunction device 1 by the above-described processing, to perform one-time printing processing, and may be given the use authority for a predetermined period.

The information processing terminals 3 according to Embodiments 1 to 5 are configured to obtain the information of the multifunction device by photographing the code pattern using the image obtaining unit 33, but are not limited to the above-described configuration. For example, when the code pattern of the information of the multifunction device is a bar code, the information processing terminal 3 may include the code read unit such as a bar code reader instead of the image obtaining unit 33, and may be configured to obtain the information of the multifunction device using the code read unit. Further, when the information processing terminal 3 includes the IC card reader, the information processing terminal 3 may be configured to obtain, by the IC card reader, the information of the multifunction device from the IC card recording the information of the multifunction device and being attached to the multifunction device 1. Further, when the multifunction device 1 and the information processing terminal 3 can communicate using infrared rays, the information processing terminal 3 may be configured to obtain the information of the multifunction device from the multifunction device 1 by the infrared communication.

In the image output systems according to embodiments 1 to 5, the multifunction device 1 notifies the authentication server 2 of the processing result, and therefore the authentication server 2 can understand the processing result by the multifunction device 1. Therefore, when the completion of the printing processing is notified, the authentication server 2 may perform the deletion of the printing data kept in the authentication server 2, the understanding of the usage of the multifunction devices 1 of each user and the like. Further, as the processing result, when the detailed usage of each user, for example, the printing processing contents such as a size of an output sheet, the number of output sheets, and the execution of the black and white printing or the color printing are included, it is possible to perform the billing processing for each user based on the information.

In Embodiments 1 to 5, the information processing terminals 3 is configured to transmit the information (image data) obtained by photographing the code pattern using the image obtaining unit 33 to the authentication server 2, and the authentication server 2 is configured to decode the code pattern to obtain the information of the multifunction device. In addition to the above-described configuration, the information processing terminal 3 may have the decoding function, and may be configured to obtain the information of the multifunction device by decoding the information obtained by photographing the code pattern, and transmit the obtained information of the multifunction device to the authentication server 2. In this case, the processing burden of the authentication server 2 can be reduced.

The image output systems according to Embodiments 1 to 5 are configured to include one authentication server 2, and the user accesses the predetermined authentication server 2 and obtain the web page providing the print service. That is, one authentication server 2 of an access destination is provided. In addition to the above-described configuration, the image output system may include the plurality of multifunction devices 1 and the plurality of authentication servers 2, and may have a configuration in which each authentication server 2 manages each of the plurality of multifunction devices 1 which are assigned in advance, and the user accesses the authentication server 2 managing the multifunction device 1 that the user desires to use and obtains the web page providing the print service from the authentication server 2.

In this case, for example, the information of the multifunction device 1 includes the server information for specifying the authentication server 2 managing the multifunction device 1, and the information processing terminal 3 accesses the appropriate authentication server 2 based on the obtained information of the multifunction device. In detail, for example, the information of the multifunction device 1 includes URL for accessing the authentication server 2 (web page) managing the multifunction device 1 that the user desires to use. Further, the information processing terminal 3 obtaining the information of the multifunction device accesses the URL included in the information of the multifunction device to access the appropriate authentication server 2, thereby obtains the appropriate web page (printing request screen). That is, the control unit 30 of the information processing terminal 3 may specify the authentication server 2 to be accessed based on the URL included in the information of the multifunction device. Therefore, the burden of the authentication processing can be dispersed by the plurality of authentication servers 2, and each user can obtain the information (destination information) of the appropriate authentication server 2 only by photographing the code pattern of the information of the multifunction device by using the image obtaining unit 33 of the information processing terminal 3.

In the image output systems according to Embodiments 1 to 5, the authentication server 2 transmits the printing data to the multifunction device 1 through the network N. Further, the image output system may have a configuration in which the authentication server 2 appropriately switches and uses one of a plurality of communication methods such as FTP communication, HTTP communication, and email transmission and the like as the method of transmitting the printing data to the multifunction device 1. In detail, the information of the multifunction device 1 includes the communication method which can be used in the multifunction device 1, and the authentication server 2 specifies the communication method which can be used in the multifunction device 1 based on the information of the multifunction device obtained from the information processing terminal 3, and uses the specified method when transmitting the printing data to the multifunction device 1. For example, when the printing data cannot be transmitted to the multifunction device 1 by the FTP communication, the authentication server 2 may transmit the printing data to the multifunction device 1 through the email. Further, an email address of the multifunction device 1 may be included in the information of the multifunction device 1, and may be registered in the multifunction device information DB 21b of the authentication server 2 in advance. Thereby, the authentication server 2 can reliably transmit the printing data to the multifunction device 1 by the optimal method.

The above-described configuration is effective in particular in the situation that the authentication server 2 is connected to the global network and the multifunction device 1 is assigned only private addresses of a network environment of enterprise. That is, in such the situation, the authentication server 2 cannot perform the direct communication with the multifunction device 1, but if the authentication server 2 can obtain an email address of the multifunction device 1, it is possible to transmit the data to the multifunction device 1 using the email address. Further, for example, in the case in which the communication method is fixed (for example, only FTP communication) when the authentication server 2 transmits the printing data to the multifunction device 1, if the multifunction device 1 at the transmitting destination cannot use the FTP communication method, the authentication server 2 cannot transmit data to the multifunction device 1. However, if one of the plurality of communication methods can be used as described above, data can be transmitted using the optimal communication method within an environment in which the image output system is constructed.

In the image output systems according to Embodiments 1 to 5, the authentication server 2 is configured to transmit the printing data to the multifunction device 1 when the authentication server 2 authenticates the user and specifies the multifunction device 1. In addition to the above-described configuration, when receiving the transmitting request from the multifunction device 1, the authentication server 2 may be configured to transmit the corresponding printing data to the multifunction device 1. For example, the multifunction device 1 periodically confirms the printing request to the authentication server 2, and if there is a confirmation from the multifunction device 1, specifically, if there is a printing request to the multifunction device 1, the control unit 20 of the authentication server 2 may be configured to transmit the corresponding printing data to the multifunction device 1. In this case, even in the environment in which the data may not be transmitted from the authentication server 2 to the multifunction device 1, if the access from the multifunction device 1 to the authentication server 2 is possible, the authentication server 2 can transmit the printing data to the multifunction device 1 depending on the request therefrom.

Further, even when the authentication server 2 fails to transmit the printing data to the multifunction device 1, the authentication server 2 can retransmit the printing data depending on the access from the multifunction device 1. Therefore there is no need to stop the printing processing. Further, according to above-described Embodiments 1 to 5, when the authentication server 2 fails to transmit the printing data to the multifunction device 1, the authentication server 2 may be configured to retransmit the printing data after a predetermined time elapses.

According to Embodiments 1 to 5, the authentication server 2 may further have a configuration to keep the information of the multifunction device and the user information (authentication information) obtained from the information processing terminal 3 in the storage unit (not illustrated). In this case, in the storage unit, the information of the multifunction device and the user information may be managed as log information and the kept information may be analyzed. Further, in the authentication server 2, a billing processing according to the usage of the image output device, an analysis processing of usage for the image output device and the like may be executed.

In the image output system according to the present invention, in addition to the multifunction device 1, a printer which has only a printer function, a display device which displays an image and the like may be used.

Although the embodiments of the present invention are described in detail, each configuration and operation may be appropriately changed and therefore are not limited to the foregoing embodiments.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An image output method comprising:
displaying a code pattern by an image output device upon receiving an instruction from a user to generate the code pattern, wherein the code pattern is collectively coded device information specifying the image output device and a setting related to processing by the image output device;
capturing an image of the code pattern displayed on the image output device using a camera of an information processing device;
analyzing the image of the code pattern to obtain the device information and the setting related to processing included in the code pattern by the information processing device;
obtaining user information specifying a user by the information processing device;
transmitting to a processor the obtained user information and device information, and the setting related to processing, by the information processing device;
authenticating the user based on the transmitted user information by the processor;
receiving an instruction for executing an image output and the setting related to processing by the image output device specified based on the transmitted device information;
executing processing based on the received setting by the image output device; and
executing the image output by the image output device when the user information is authenticated by the processor.

2. The image output method according to claim 1, wherein the code pattern is a barcode.

3. The image output method according to claim 1, wherein the code pattern is a QR code.

4. The image output method according to claim 1, wherein the information processing device comprises a portable computer, a portable game machine, a portable telephone, or a personal digital assistants (PDA).

5. The image output method according to claim 1, wherein the device information is an Internet Protocol address.

6. The image output method according to claim 1, wherein the user information comprises a user ID and a password.

7. The image output method according to claim 1, comprising transmitting, by the processor, the printing data selected by the user through the information processing device to the specified image output device.

8. An image output method using an information processing device, comprising:
obtaining device information and a setting related to processing from data obtained by capturing an image of a code pattern displayed on an image output device using a camera provided in the information processing device, wherein the code pattern is collectively coded device information specifying an image output device and a setting related to processing by the image output device;
obtaining user information specifying a user by the information processing device; and
transmitting the obtained device information and setting related to processing, and the obtained user information to an external device, by the information processing device.

9. The image output method according to claim 8, wherein the code pattern is a barcode.

10. The image output method according to claim 8, wherein the code pattern is a QR code.

11. An image output device comprising:
a display configured to display a code pattern upon receiving an instruction from a user to generate the code pattern, wherein the code pattern is collectively coded device information specifying the image output device and a setting related to processing by the image output device;
a receiver configured to receive an instruction for executing an image output and the setting related to processing, wherein the instruction is transmitted to the image output device specified based on the device information; and
a processor configured to:
execute processing based on the received setting; and execute the image output when user information inputted in the information processing device is authenticated.

\* \* \* \* \*